US012664813B1

(12) United States Patent
Shah et al.

(10) Patent No.: US 12,664,813 B1
(45) Date of Patent: Jun. 23, 2026

(54) METHOD AND SYSTEM FOR TRANSFORMING LEGACY LAB NOTEBOOKS INTO CHEMICAL INTELLIGENCE AND DRUG DISCOVERY INSIGHTS USING OPTICAL CHEMICAL STRUCTURE RECOGNITION AND NATURAL LANGUAGE PROCESSING TO EXTRACT KNOWLEDGE FROM HANDWRITTEN LAB RECORDS

(71) Applicants: Shobhan Shah, San Jose, CA (US);
Aarshit Mittal, Ghaziabad (IN); Parmi Shah, Cupertino, CA (US)

(72) Inventors: Shobhan Shah, San Jose, CA (US);
Aarshit Mittal, Ghaziabad (IN); Parmi Shah, Cupertino, CA (US)

( * ) Notice: Subject to any disclaimer, the term of this patent is extended or adjusted under 35 U.S.C. 154(b) by 0 days.

(21) Appl. No.: 19/307,126

(22) Filed: Aug. 22, 2025

(51) Int. Cl.
*G06V 30/422* (2022.01)
*G06F 16/901* (2019.01)
(Continued)

(52) U.S. Cl.
CPC ........ *G06V 30/422* (2022.01); *G06F 16/9024* (2019.01); *G06N 3/08* (2013.01); *G06V 30/19093* (2022.01); *G06V 30/274* (2022.01)

(58) Field of Classification Search
CPC .......... G06V 30/422; G06V 30/19093; G06V 30/274; G06F 16/9024; G06N 3/08; G06T 2207/20081
(Continued)

(56) References Cited

U.S. PATENT DOCUMENTS 5,157,736 A 10/1992 Boyer et al.
7,137,076 B2 11/2006 Iwema et al.
(Continued)

FOREIGN PATENT DOCUMENTS

CN 109784342 B 3/2021
CN 112818645 A * 5/2021 ............. G06V 30/40
(Continued)

OTHER PUBLICATIONS

Pepper, Joel, et al. "AI-Ready Data: Knowledge Extraction from Archival Lab Notebooks." 2024 IEEE International Conference on Big Data (BigData). IEEE, 2024. (Year: 2024).*
(Continued)

*Primary Examiner* — Chineyere Wills-Burns
*Assistant Examiner* — Emmanuel Silva-Avina
(74) *Attorney, Agent, or Firm* — LegalForce RAPC Worldwide

(57) ABSTRACT

Disclosed is a computer-implemented method that includes receiving a digital image or a scanned page of a historical lab notebook that contains handwritten text and a chemical structure drawing. The method includes performing optical character recognition on the image or the page to convert handwritten text into machine-readable text data. The method includes performing optical chemical structure recognition on the image or the page to identify hand-drawn chemical structures and reaction diagrams. The method includes translating each chemical structure and reaction diagram into a standardized digital representation. The method includes analyzing the recognized text data with a natural language processing engine to extract scientific context and metadata. The metadata includes identifying a chemical entity, a reaction condition, an experimental parameter, or a result. The method includes correlating the output of the chemical structure recognition and the natural (Continued)

PERIODIC UPDATES FROM NEW NOTEBOOKS

HISTORICAL LAB NOTEBOOK 102

IMAGE PREPROCESSING MODULE 104

OCR MODULE 106

NLP ENGINE 110

OCSR MODULE 108

CORRELATION MODULE 112

AUTHENTICATED ACCESS POINT 126

STRUCTURED KNOWLEDGE BASE 114

DATA STORAGE SUBSYSTEM 124

PRIVATE CLOUD / ON-PREMISES NETWORK 130

AI MODEL 116

PROCESSORS AND MEMORY 120

AI INFERENCE ENGINE 118

REACTION OUTCOME AND CONDITION PREDICTOR 122

USER 132

USER INTERFACE 128

SYSTEM ARCHITECTURE OVERVIEW 150 OF AN AI-BASED CHEMICAL KNOWLEDGE EXTRACTION AND INFERENCE SYSTEM 100 language processing by associating each chemical structure with its textual context.

30 Claims, 8 Drawing Sheets

(51) Int. Cl.
| | |
|---|---|
| *G06N 3/08* | (2023.01) |
| *G06V 30/19* | (2022.01) |
| *G06V 30/262* | (2022.01) |

(58) Field of Classification Search
USPC ......................................................... 382/113
See application file for complete search history.

(56) References Cited

U.S. PATENT DOCUMENTS

| | | | | |
|---|---|---|---|---|
| 7,356,416 | B2 | 4/2008 | Busa | |
| 7,724,257 | B2 | 5/2010 | Smith et al. | |
| 8,718,375 | B2 * | 5/2014 | Ouyang | G06V 30/347 |
| | | | | 382/187 |
| 9,031,977 | B2 * | 5/2015 | Smith | G06V 30/422 |
| | | | | 707/769 |
| 9,535,583 | B2 | 1/2017 | Smellie et al. | |
| 9,558,403 | B2 | 1/2017 | Karthikeyan | |
| 9,965,597 | B2 | 5/2018 | Becker et al. | |
| 10,622,098 | B2 | 4/2020 | Coley et al. | |
| 10,902,952 | B2 | 1/2021 | Lucas et al. | |
| 11,087,077 | B2 | 8/2021 | Wheaton et al. | |
| 11,195,007 | B2 | 12/2021 | Duke et al. | |
| 11,232,215 | B2 | 1/2022 | Seinen | |
| 11,354,582 | B1 | 6/2022 | Prat et al. | |
| 11,423,042 | B2 | 8/2022 | Sirangimoorthy et al. | |
| 11,456,061 | B2 | 9/2022 | Karthikeyan et al. | |
| 11,501,854 | B2 | 11/2022 | Morieux et al. | |
| 11,587,646 | B2 | 2/2023 | Colby et al. | |
| 11,735,292 | B2 | 8/2023 | Kishimoto et al. | |
| 11,942,191 | B2 | 3/2024 | Rong et al. | |
| 12,079,737 | B1 | 9/2024 | Biswas | |
| 12,288,600 | B2 | 4/2025 | Sklaroff | |
| 12,346,660 | B2 | 7/2025 | Hutchins | |
| 12,346,923 | B2 | 7/2025 | Oh et al. | |
| 2005/0065776 | A1 | 3/2005 | Coden et al. | |
| 2010/0163316 | A1 | 7/2010 | Chang et al. | |
| 2011/0202331 | A1 * | 8/2011 | Lawson | G16C 20/70 |
| | | | | 707/E17.014 |
| 2013/0160102 | A1 | 6/2013 | Decara et al. | |
| 2014/0301608 | A1 | 10/2014 | Karthikeyan | |
| 2020/0381087 | A1 | 12/2020 | Ozeran et al. | |
| 2021/0304854 | A1 | 9/2021 | Lee et al. | |
| 2022/0101972 | A1 | 3/2022 | Bajpai et al. | |
| 2022/0172802 | A1 | 6/2022 | Konstantinov et al. | |
| 2022/0230712 | A1 | 7/2022 | Sheberla et al. | |
| 2023/0043540 | A1 | 2/2023 | Yu et al. | |
| 2023/0131234 | A1 | 4/2023 | Jastrzebski et al. | |
| 2023/0154572 | A1 | 5/2023 | Zagribelnyy et al. | |
| 2023/0223112 | A1 | 7/2023 | Sun et al. | |
| 2024/0242788 | A1 | 7/2024 | Khokhlov et al. | |
| 2024/0257921 | A1 * | 8/2024 | Madrid | G16C 20/80 |
| 2024/0265380 | A1 | 8/2024 | Arneault et al. | |
| 2025/0231983 | A1 | 7/2025 | Malviya et al. | |

FOREIGN PATENT DOCUMENTS

| | | | |
|---|---|---|---|
| CN | 114842486 | A | 8/2022 |
| WO | 1996041302 | A1 | 12/1996 |
| WO | 2003067472 | A1 | 8/2003 |
| WO | 2010086862 | A1 | 8/2010 |
| WO | 2011076809 | A2 | 6/2011 |
| WO | 2020023650 | A1 | 1/2020 |
| WO | 2025081097 | A1 | 4/2025 |

OTHER PUBLICATIONS

Chen, Yufan, et al. "Towards Large-scale Chemical Reaction Image Parsing via a Multimodal Large Language Model." arXiv preprint arXiv:2503.08156 (2025). (Year: 2025).*

Rajan, Kohulan, et al. "A review of optical chemical structure recognition tools." Journal of Cheminformatics 12.1 (2020): 60. (Year: 2020).*

"A review of optical chemical structure recognition tools", by Kohulan Rajan et al., Published at Journal of Cheminformatics, Published Online on [Oct. 7, 2020] https://d-nb.info/1221948210/34.

"Optical Recognition of Hand-Drawn Chemical Structures", by Bradley Emi, Published at Stanford University, Found Online on [Aug. 14, 2025] https://web.stanford.edu/class/cs231a/prev projects_2016/optical_recognition_of_chemical_structures.pdf.

"Towards Large-scale Chemical Reaction Image Parsing via a Multimodal Large Language Model", by Yufan Chen, Published at Arxiv, Published Online on [Mar. 11, 2025] https://arxiv.org/pdf/2503.08156v1.

"Review of techniques and models used in optical chemical structure recognition in images and scanned documents", by Fidan Musazade et al., Published at Journal of Cheminformatics, published Online on [Sep. 9, 2022] https://jcheminf.biomedcentral.com/counter/pdf/10.1186/s13321-022-00642-3.pdf.

"Comparing software tools for optical chemical structure recognition", by Aleksei Krasnov et al., Published at Royal Society of Chemistry, Published Online on [Mar. 7, 2024] https://pubs.rsc.org/en/content/articlepdf/2024/dd/d3dd00228d.

"ReactionDataExtractor 2.0: A Deep Learning Approach for Data Extraction from Chemical Reaction Schemes", by Damian M. Wilary et al., Published at ACS Publication, Published Online on [Sep. 20, 2023] https://pubs.acs.org/doi/pdf/10.1021/acs.jcim.3c00422?ref=article_openPDF.

"Optical Structure Recognition Software to Recover Chemical Information: OSRA—An Open Source Solution", by Igor V. Filippov et al., Published at National Institute of Health, Published Online on [Feb. 17, 2009] https://pmc.ncbi.nlm.nih.gov/articles/PMC2889020/pdf/nihms96341.pdf.

"RFL: Simplifying Chemical Structure Recognition with Ring-Free Language", by Qikal Chang et al., Published at Arxiv, Published Online on [Dec. 10, 2024] https://arxiv.org/pdf/2412.07594v1.

"ChemGrapher: Optical Graph Recognition of C, by hemical Compounds by Deep Learning", by Martijn Oldenhof, Published at Arxiv, Published Online on [Feb. 20, 2023] https://arxiv.org/pdf/2002.09914.

* cited by examiner

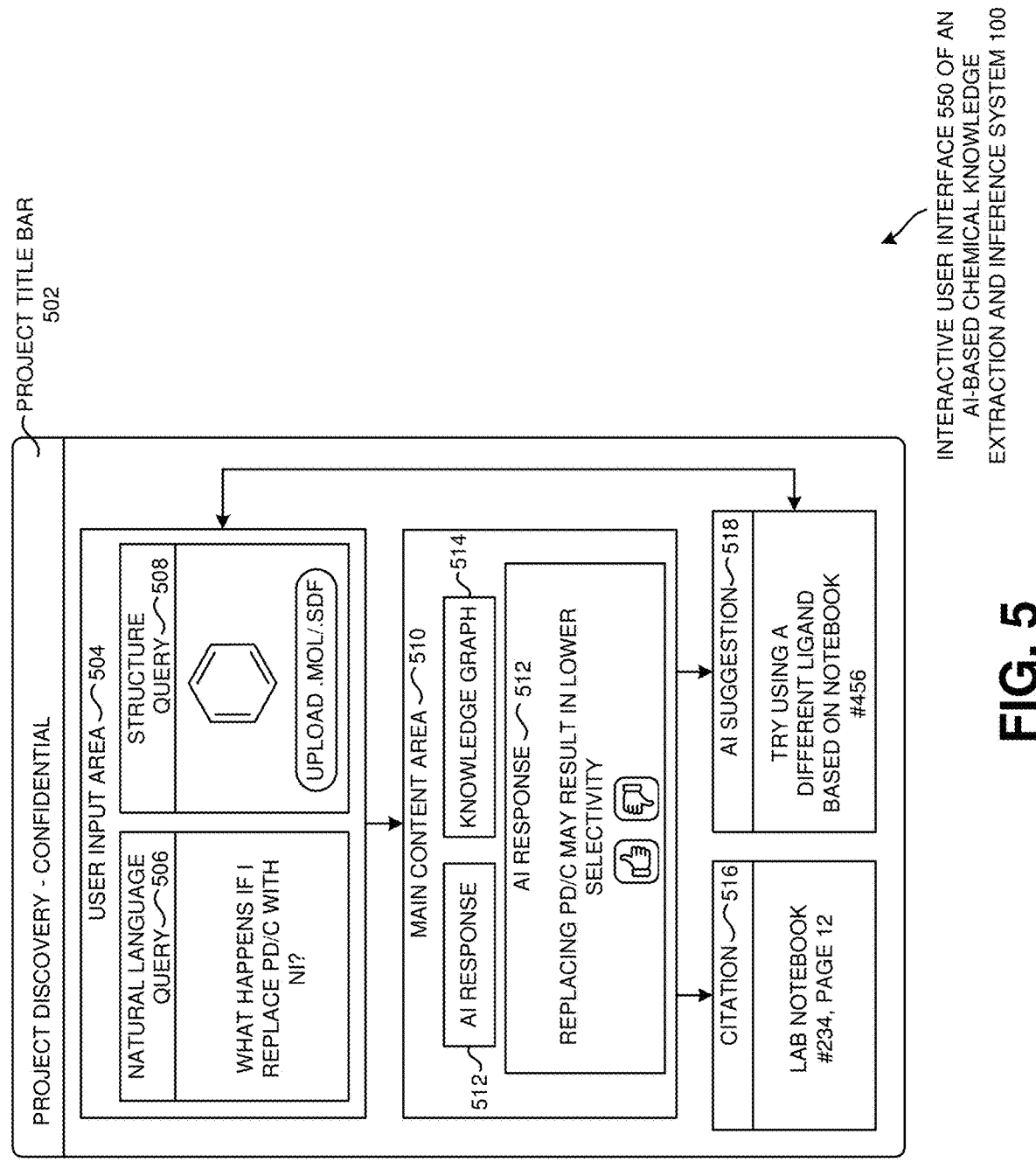

FIG. 5

PROJECT TITLE BAR 502

PROJECT DISCOVERY - CONFIDENTIAL

USER INPUT AREA 504

NATURAL LANGUAGE QUERY 506

WHAT HAPPENS IF I REPLACE PD/C WITH NI?

STRUCTURE QUERY 508

UPLOAD .MOL/.SDF

MAIN CONTENT AREA 510

KNOWLEDGE GRAPH 514

AI RESPONSE 512

AI RESPONSE

REPLACING PD/C MAY RESULT IN LOWER SELECTIVITY

CITATION 516

LAB NOTEBOOK #234, PAGE 12

AI SUGGESTION 518

TRY USING A DIFFERENT LIGAND BASED ON NOTEBOOK #456

INTERACTIVE USER INTERFACE 550 OF AN AI-BASED CHEMICAL KNOWLEDGE EXTRACTION AND INFERENCE SYSTEM 100

PRIVATE CLOUD / ON-PREMISES NETWORK 130

DATA & AI ISOLATION LAYER 702

STRUCTURED KNOWLEDGE BASE 114

AI INFERENCE ENGINE 118

PROCESSORS & MEMORY 120

INTERNAL DOCUMENT VAULT 704

AUTHENTICATED ACCESS POINT 126

USER 132

DEPLOYMENT ENVIRONMENT & DATA SECURITY 750 OF AN AI-BASED CHEMICAL KNOWLEDGE EXTRACTION AND INFERENCE SYSTEM 100

NON-TRANSITORY COMPUTER-READABLE MEDIUM 850 OF AN AI-BASED CHEMICAL KNOWLEDGE EXTRACTION AND INFERENCE SYSTEM 100

NON-TRANSITORY COMPUTER-READABLE MEDIUM 802

OCR INSTRUCTIONS 804

OCSR INSTRUCTIONS 806

NLP INSTRUCTIONS 808

KNOWLEDGE BASE INDEXING INSTRUCTIONS 810

AI MODEL / ASSISTANT INSTRUCTIONS 812

METHOD AND SYSTEM FOR TRANSFORMING LEGACY LAB NOTEBOOKS INTO CHEMICAL INTELLIGENCE AND DRUG DISCOVERY INSIGHTS USING OPTICAL CHEMICAL STRUCTURE RECOGNITION AND NATURAL LANGUAGE PROCESSING TO EXTRACT KNOWLEDGE FROM HANDWRITTEN LAB RECORDS

FIELD OF TECHNOLOGY

The present disclosure relates to the fields of chemical informatics, artificial intelligence, and digital archival systems. More particularly, it pertains to methods and systems for processing and transforming unstructured scientific records, including handwritten laboratory notebooks and archival research data, into structured, machine-readable chemical and contextual information to support research intelligence, discovery workflows, and/or scientific knowledge retention.

BACKGROUND

Scientists have historically recorded important technical content in paper notebooks (e.g., material properties, compound structures, synthesis steps, and partial results). Because this information exists in paper notebooks, it cannot be efficiently searched, indexed, or structured by conventional electronic systems. Handwritten text and hand-drawn chemical diagrams are not readily compatible with digital pipelines used for tasks such as full-text search, metadata extraction, or natural language processing. As a result, the content is not suitable for training artificial intelligence models, including large language models or predictive systems. This limits the organization's ability to extract insights from prior work, identify trends, or reuse knowledge across teams or product cycles.

In fields such as pharmaceutical and chemical development, where time and R&D efficiency can influence competitive position, the inability to use historical records may lead to duplication of effort, delayed progress, and/or loss of institutional knowledge. Entire development programs may be affected when prior findings are not reviewed, contextualized, and/or reused. Scientific work product created by employees who left the organization years ago, often remains the trade secret intellectual property of the enterprise. This includes technical content recorded in paper notebooks (e.g., experimental formulations, compound synthesis methods, and observed reaction outcomes) that was never publicly disclosed. Although the organization retains legal rights to this information, it may be unable to locate, interpret, or apply it in current research and development efforts. As a result, valuable intellectual capital may sit unused, offering no competitive or financial return despite continued ownership.

An organization's limited ability to integrate its past scientific output with current workflows may slow discovery, increase costs, and/or reduce strategic agility. Without a mechanism to access, structure, and/or interpret these records at scale, this information may become difficult to retrieve or apply. As a result, teams within the same organization may unknowingly repeat prior work, pursue previously abandoned directions, and/or overlook relevant internal data.

SUMMARY

Described is a method and system of transforming legacy lab notebooks into chemical intelligence and drug discovery insights using optical chemical structure recognition and natural language processing to extract knowledge from handwritten lab records.

In one aspect, a computer-implemented method is described. The method includes receiving a digital image and/or a scanned page of a historical lab notebook that contains handwritten text and/or a chemical structure drawing. The method includes performing optical character recognition on the image and/or the page to convert handwritten text into machine-readable text data. The method includes performing optical chemical structure recognition on the image and/or the page to identify hand-drawn chemical structures and/or reaction diagrams. The method includes translating each chemical structure and/or reaction diagram into a standardized digital representation. The method includes analyzing the recognized text data with a natural language processing engine to extract scientific context and metadata. The metadata includes identifying a chemical entity, a reaction condition, an experimental parameter, and/or a result. The method includes correlating the output of the chemical structure recognition and the natural language processing by associating each chemical structure with its textual context.

The method includes generating a structured record of experiments that link chemical compounds to experimental details and/or outcomes. The method includes constructing a structured knowledge base from the structured records. The structured knowledge base includes chemical information and/or experimental metadata. The structured knowledge base is indexed by chemical structure identifiers and/or textual keywords. The method includes training and/or configuring an artificial intelligence model using data in the structured knowledge base. The artificial intelligence model encodes a representation of scientific knowledge, the historical lab notebooks, and/or problem-solving behavior. The method includes providing an interactive interface to the artificial intelligence model. A user can submit a query and engage with the artificial intelligence model. The user receives an insight, an explanation, and/or a prediction related to drug discovery. The artificial intelligence model responds based on information and/or inferred knowledge from the historical lab notebooks.

The method may include converting each detected chemical structure drawing into a unique textual identifier and/or coding. The coding may include a SMILES string, an InChI identifier, and/or a graph-based data structure representing atoms and bonds. The method may include using named entity recognition in the natural language processing to identify a chemical name, an experimental action, a reagent, a reaction condition, and/or a result metric. The identified entities may be used to tag and contextualize chemical structures in the structured knowledge base. The method may include detecting and reconstructing a chemical reaction pathway by identifying reaction arrows and/or chemical structures in proximity.

The method may create structured records linking reactants to products and including associated reaction yields. The method may include determining the role of a chemical structure in an experiment by analyzing textual cues and/or diagram placement. The role may be a reactant, a product, a catalyst, a solvent, and/or an intermediate. The method may include populating the knowledge base with metadata for each recognized chemical structure. The metadata may include retrieved and/or calculated chemical and/or biological properties, such as molecular weight, physicochemical properties, and/or bioactivity data. The structured knowledge base may be indexed to support substructure and/or similarity searches. A user may query by structure and retrieve entries with matching and/or similar structures.

The structured knowledge base may be implemented as a graph-based ontology. Nodes may represent compounds, experiments, and/or observations. Edges may represent relationships such as compound usage, production, and/or outcomes. Training the artificial intelligence model may include fine-tuning a domain-specific large language model on notebook text and/or metadata. This may provide understanding of historical experiments and/or scientist problem-solving behavior. The artificial intelligence model may simulate the reasoning of a particular researcher and/or research group. The model may explain how a past scientist might approach a current research problem and/or propose a rationale. The method may include a query interface that accepts natural-language questions about experiments and/or potential new experiments.

The model may generate answers and/or suggestions by referencing the structured knowledge base. The method may include using the structured knowledge base to train a predictive model. The model may predict outcomes of candidate reactions and/or recommend optimal reaction conditions for a synthetic goal. The method may include extracting and linking experimental result data such as NMR, IR, melting points, and/or other analytical data. The historical lab notebooks may include embedded spectra, chromatograms, and/or assay results. The OCR and OCSR modules may be trained on handwritten and/or low-quality documents using deep neural networks. The models may improve recognition accuracy on archival notebook pages.

The structured knowledge base may be maintained in a secure cloud/on-premises environment. The AI model may be restricted to proprietary notebook data for training and/or inference, preserving confidentiality. The method may include periodically updating the knowledge base and AI model as new notebooks become available. This may support continuous learning and/or up-to-date scientific insight. The interactive interface may provide an explanation and/or citation from the historical lab notebooks alongside model answers. This may ensure transparency and/or traceability of AI conclusions.

The method may include registering recognized chemical structures and/or reaction schemes into a private knowledge base. Each structure may be stored with its experimental role, predicted properties, and/or metadata. The recognized compounds and/or schemes may be usable in an electronic lab notebook. This may enable new experiments based on system-registered compounds and/or predicted properties. The method may include calculating predicted properties for each compound. The properties may include solubility, log P, pKa, ADMET, hERG inhibition, BBB permeability, and/or binding affinity. The structure knowledge base may support real-time delivery of compounds, reactions, and/or predictions into the ELN. This may enable a closed-loop workflow from archival extraction to experimental execution.

In another aspect, a system is for transforming unstructured lab notebook data into a structured chemical knowledge base and/or an interactive artificial intelligence assistant. The system is configured with a processor and memory. An image processing module is configured to ingest and/or preprocess scanned images of a historical lab notebook. An optical character recognition module is configured to recognize and output text from handwritten sections of the historical lab notebooks. An optical chemical structure recognition module is configured to detect graphical depictions of a chemical structure and/or reactions on the pages. The optical chemical structure recognition module is configured to convert them into machine-readable chemical representations.

A natural language processing module is configured to analyze the textual content and extract entities and/or relationships related to chemical experiments. The natural language processing module is configured to extract a chemical name, a reaction condition, and/or a result. A data storage subsystem is for storing a structured knowledge base. The structured knowledge base includes recognized chemical structures and/or extracted textual metadata. The structured knowledge base forms an indexed archive of experiments. An AI inference engine is connected to the structured knowledge base. The AI inference engine is configured to respond to a user query and/or perform analytical tasks using the structured knowledge base. The AI inference engine is a virtual scientific assistant derived from the unstructured lab notebook data.

The system may be deployed within a private cloud and/or on-premises network protected by zero-trust security. The structured knowledge base may be implemented as a graph-based ontology. The OCR and/or OCSR modules may use deep neural network models fine-tuned on archival scientific handwriting. The system may periodically ingest historical lab notebook, update the structured knowledge base, and/or refresh the AI inference engine to enable continuous learning.

In yet another aspect, a non-transitory computer-readable medium is storing program instructions. The instructions are executed by one or more processors and memory. The execution causes the processors to perform a hand-drawn depiction of a chemical structure and/or a reaction diagram is detected on handwritten pages of the historical lab notebooks. The handwritten depiction is converted into a machine-readable chemical representation. Textual content relevant to a chemical name, a reaction condition, and/or a result surrounding the hand-drawn depiction is analyzed. Entities and/or relationships are extracted from the textual content and/or the hand-drawn depiction. An unstructured lab notebook is transformed into a structured knowledge base.

The program instructions may further cause predicted properties to be calculated for each identified compound. The program instructions may update the named entity recognition model and/or refresh the graph-based ontology when new notebook data is ingested. The program instructions may also render an interactive interface that accepts both natural-language and/or structure-based queries using SMILES, InChI, and/or MOL file inputs.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 5 is an interactive user interface view of the AI-based chemical knowledge extraction and inference system of FIG. 1, illustrating a natural language query interface, AI-generated responses, citation linking, and contextual structure-based exploration tools, according to one embodiment.

Figure 1:
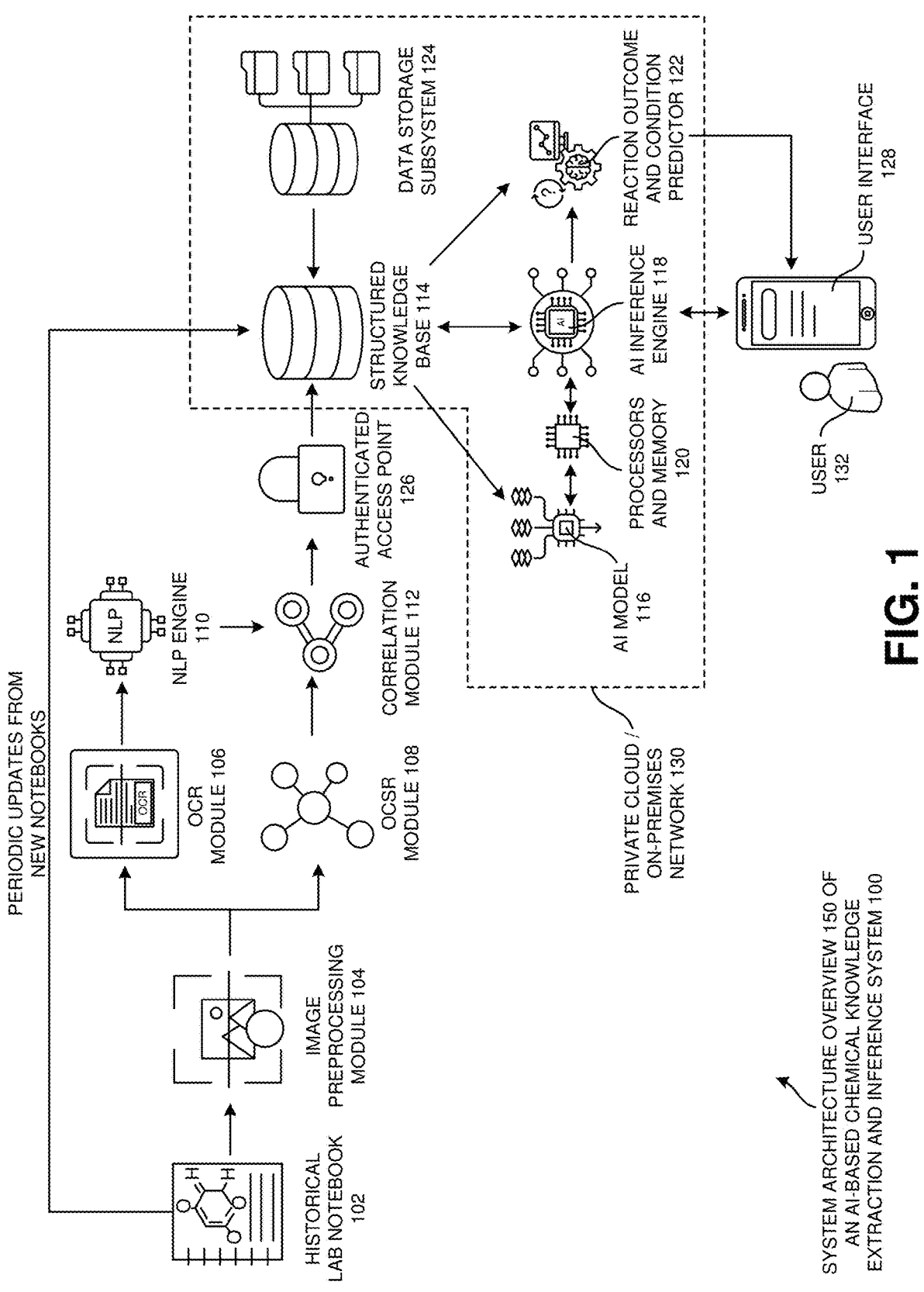
FIG. 1 is a system architecture view illustrating an AI-based chemical knowledge extraction and inference system for transforming unstructured historical lab notebooks into structured scientific insights, according to one embodiment.

Other features of the present embodiments will be apparent from the accompanying drawings and from the detailed description that follows.

DETAILED DESCRIPTION

Described is a method and system of transforming legacy lab notebooks into chemical intelligence and drug discovery insights using optical chemical structure recognition and natural language processing to extract knowledge from handwritten lab records.

In one embodiment, a computer-implemented method is described. The method includes receiving a digital image and/or a scanned page of a historical lab notebook 102 that contains handwritten text and/or a chemical structure drawing. The method includes performing optical character recognition 106 on the image and/or the page to convert handwritten text into machine-readable text data. The method includes performing optical chemical structure recognition 108 on the image and/or the page to identify hand-drawn chemical structures and/or reaction diagrams. The method includes translating each chemical structure and/or reaction diagram into a standardized digital representation. The method includes analyzing the recognized text data with a natural language processing engine 110 to extract scientific context and metadata. The metadata includes identifying a chemical entity, a reaction condition, an experimental parameter, and/or a result. The method includes correlating the output of the optical chemical structure recognition 108 and the natural language processing 110 engine by associating each chemical structure with its textual context.

The method includes generating a structured record of experiments that link chemical compounds to experimental details and/or outcomes. The method includes constructing a structured knowledge base 114 from the structured records. The structured knowledge base 114 includes chemical information and/or experimental metadata. The structured knowledge base 114 is indexed by chemical structure identifiers and/or textual keywords. The method includes training and/or configuring an artificial intelligence model 116 using data in the structured knowledge base 114. The artificial intelligence model encodes a representation of scientific knowledge, the historical lab notebooks 102, and/or problem-solving behavior. The method includes providing an interactive interface to the artificial intelligence model 116. A user 132 can submit a query and engage with the artificial intelligence model 116. The user 132 receives an insight, an explanation, and/or a prediction related to drug discovery. The artificial intelligence model 116 responds based on information and/or inferred knowledge from the historical lab notebooks 102.

The method may include converting each detected chemical structure drawing into a unique textual identifier and/or coding. The coding may include a SMILES string, an InChI identifier, and/or a graph-based data structure representing atoms and bonds. The method may include using named entity recognition in the natural language processing 110 to identify a chemical name, an experimental action, a reagent, a reaction condition, and/or a result metric. The identified entities may be used to tag and contextualize chemical structures in the structured knowledge base 114. The method may include detecting and reconstructing a chemical reaction pathway 206 by identifying reaction arrows and/or chemical structures in proximity.

The method may create structured records linking reactants to products and including associated reaction yields. The method may include determining the role of a chemical structure in an experiment by analyzing textual cues and/or diagram placement. The role may be a reactant, a product, a catalyst, a solvent, and/or an intermediate. The method may include populating the knowledge base 114 with metadata for each recognized chemical structure. The metadata may include retrieved and/or calculated chemical and/or biological properties 310, such as molecular weight, physicochemical properties, and/or bioactivity data. The structured knowledge base 114 may be indexed to support substructure and/or similarity searches. The user 132 may query by structure and retrieve entries with matching and/or similar structures.

The structured knowledge base 114 may be implemented as a graph-based ontology. Nodes 302 may represent compounds, experiments, and/or observations. Edges 304 may represent relationships such as compound usage, production, and/or outcomes. Training the artificial intelligence model 116 may include domain-specific large language model 410 on notebook text and/or metadata. This may provide understanding of historical experiments and/or scientist problem-solving behavior. The artificial intelligence model 116 may simulate the reasoning of a particular researcher and/or research group. The artificial intelligence model 116 may explain how a past scientist might approach a current research problem and/or propose a rationale. The method may include a query interface that accepts natural-language questions about experiments and/or potential new experiments.

The artificial intelligence model 116 may generate answers and/or suggestions by referencing the structured knowledge base 114. The method may include using the structured knowledge base 114 to train a predictive model 122. The model may predict outcomes of candidate reactions and/or recommend optimal reaction conditions for a synthetic goal. The method may include extracting and linking experimental result data 312 such as NMR, IR, melting points, and/or other analytical data. The historical lab notebooks 102 may include embedded spectra, chromatograms, and/or assay results. The OCR 106 and the OCSR 108 modules may be trained on handwritten and/or low-quality documents using deep neural networks. The models may improve recognition accuracy on archival notebook pages.

The structured knowledge base 114 may be maintained in a private cloud/on-premises environment 130. The AI model 116 may be restricted to proprietary notebook data for training and/or inference, preserving confidentiality. The method may include periodically updating the structure knowledge base 114 and the AI model 116 as new notebooks become available. This may support continuous learning and/or up-to-date scientific insight. The interactive interface 128 may provide an explanation and/or citation from the historical lab notebooks 102 alongside model answers. This may ensure transparency and/or traceability of AI conclusions.

The method may include registering recognized chemical structures and/or reaction schemes into a private knowledge base. Each structure may be stored with its experimental role, predicted properties, and/or metadata. The recognized compounds and/or schemes may be usable in an electronic lab notebook. This may enable new experiments based on system-registered compounds and/or predicted properties. The method may include calculating predicted properties for each compound. The properties may include solubility, log P, pKa, ADMET, hERG inhibition, BBB permeability, and/or binding affinity. The knowledge base 114 may support real-time delivery of compounds, reactions, and/or predictions into the ELN. This may enable a closed-loop workflow from archival extraction to experimental execution.

In another embodiment, a system is for transforming unstructured lab notebook data into a structured knowledge base 114 and/or an interactive artificial intelligence assistant 602. The system is configured with a processor and memory 120. An image processing module 104 is configured to ingest and/or preprocess scanned images of a historical lab notebook 102. An optical character recognition module 106 is configured to recognize and output text from handwritten sections of the historical lab notebook 102. An optical chemical structure recognition module 108 is configured to detect graphical depictions of a chemical structure and/or reactions on the pages. The optical chemical structure recognition module 108 is configured to convert them into machine-readable chemical representations.

A natural language processing module 110 is configured to analyze the textual content and extract entities and/or relationships related to chemical experiments. The natural language processing module 110 is configured to extract a chemical name, a reaction condition, and/or a result. A data storage subsystem 124 is for storing a structured knowledge base 114. The structured knowledge base 114 includes recognized chemical structures and/or extracted textual metadata. The structured knowledge base 114 forms an indexed archive of experiments. An AI inference engine 118 is connected to the structured knowledge base 114. The AI inference engine 118 is configured to respond to a user query and/or perform analytical tasks using the structured knowledge base 114. The AI inference engine 118 is a virtual scientific assistant derived from the unstructured lab notebook data.

The system may be deployed within a private cloud and/or on-premises network 130 protected by zero-trust security. The structured knowledge base 118 may be implemented as a graph-based ontology. The OCR 106 and/or the OCSR 108 modules may use deep neural network models fine-tuned on archival scientific handwriting. The system may periodically ingest historical lab notebook pages, update the structured knowledge base 114, and/or refresh the AI inference engine 118 to enable continuous learning.

In yet another embodiment, a non-transitory computer-readable medium 802 is storing program instructions. The instructions are executed by one or more processors and memory 120. The execution causes the processors and memory 120 to perform a hand-drawn depiction of a chemical structure and/or a reaction diagram is detected on handwritten pages of historical lab notebooks 102. The hand-written depiction is converted into a machine-readable chemical representation. Textual content relevant to a chemical name, a reaction condition, and/or a result surrounding the hand-drawn depiction is analyzed. Entities and/or relationships are extracted from the textual content and/or the hand-drawn depiction. An unstructured lab notebook is transformed into a structured knowledge base 114.

The program instructions may further cause predicted properties to be calculated for each identified compound. The program instructions may update the named entity recognition model and/or refresh the graph-based ontology when new notebook data is ingested. The program instructions may also render an interactive user interface 128 that accepts both natural-language and/or structure-based queries using SMILES, InChI, and/or MOL file inputs.

FIG. 1 is a system architecture overview 150 of an artificial intelligence-based chemical knowledge extraction and inference system 100, according to one embodiment. FIG. 1 illustrates a historical lab notebook 102, an image preprocessing module 104, an OCR module 106, an OCSR module 108, a NLP engine 110, a correlation module 112, an authenticated access point 126, a structured knowledge base 114, a data storage subsystem 124, an AI model training module 116, a processors and memory 120, an AI inference engine 118, a reaction outcome and condition predictor 122, a private cloud/on-premises network 130, an user interface 128, and an user 130, according to one embodiment.

The historical lab notebook 102 may represent a physical and/or electronically scanned lab notebook page, which may include handwritten content, such as chemical diagrams, reaction schemes, experimental notes, and/or scientific observations done by the scientific researchers during laboratory work. The historical lab notebook 102 may serve as the primary unstructured data source within the artificial intelligence-based chemical knowledge extraction and inference system 100, which may offer raw chemical and experimental insight from past laboratory activities. The artificial intelligence-based chemical knowledge extraction and inference system 100 may ingest these pages from the historical lab notebook 102 through scanned archives and/or digital uploads originating from an electronic lab notebook (ELN) platform.

Once received, each page of the historical lab notebook 102 may be queued for processing, where the text and/or chemical structures are extracted using the optical character recognition (OCR) 106 module and the optical chemical structure recognition (OCSR) 108 module. This transformation enables the artificial intelligence-based chemical knowledge extraction and inference system 100 to convert historical, analog scientific records into a structured digital format suitable for downstream analysis, chemical entity recognition, semantic interpretation, and/or machine learning-driven inference, according to one embodiment.

The image preprocessing module 104 may be configured to prepare scanned and/or digital images of the historical lab notebooks 102 for downstream analysis. The image preprocessing module 104 may enhance the clarity, alignment, and/or segmentation of the raw input to facilitate accurate recognition by the OCR module 106 and the OCSR module 108. The image preprocessing module 104 may apply a series of transformations such as noise reduction, brightness normalization, contrast enhancement, skew correction, and/or separation of overlapping text and/or chemical drawings. These operations may ensure that both handwritten annotations and hand-drawn chemical structure drawings are isolated with high fidelity, thereby improving the accuracy of machine-readable conversions, according to one embodiment.

The image preprocessing module 104 may leverage deep learning-based denoising and edge-detection models trained specifically on archival lab pages to accommodate such factors as ink quality, paper degradation, and handwriting styles. The preprocessed outputs from the image preprocessing module 104 may then be forwarded to the OCR module 106 and the OCSR module 108 for structured data extraction, enabling reliable digitization of legacy experimental records for integration into the structured knowledge base 114, according to one embodiment.

The OCR module 106 may perform Optical Character Recognition on the scanned historical laboratory notebooks 102. The OCR module 106 may recognize and/or convert handwritten text from at least one physical page into machine-readable digital text. The OCR module 106 may operate using an advanced configuration that is tailored to interpret complex scientific notations and handwriting styles commonly found in laboratory research records. The OCR module 106 may leverage one or more deep neural networks pre-trained specifically on scientific handwriting styles to interpret degraded, low-resolution, and/or noisy archival images. The OCR module 106 may extract structured and/or unstructured experimental metadata such as chemical names, temperature values, time intervals, and/or procedural annotations, according to one embodiment The OCR module 106 may convert such information into a structured digital format to make previously inaccessible handwritten data usable by digital systems. The OCR module 106 may then pass the resulting machine-readable text to a downstream module for contextual analysis, chemical role assignment, metadata tagging, and/or integration into structured knowledge bases, thereby enabling advanced querying and/or reasoning across historical experimental records, according to one embodiment.

The OCSR module 108 may be a chemical structure recognition engine configured to detect and/or interpret hand-drawn molecular structures and/or reaction schemes within at least one historical laboratory notebook 102. The OCSR module 108 may identify atom nodes, bond types, and/or graphical arrows representing the reactions. The OCSR module 108 may translate such graphical elements into digital molecular formats, such as SMILES strings, InChI identifiers, and/or graph-based representations. The OCSR module 108 may operate using advanced image processing and/or deep learning techniques trained on chemical structure diagrams commonly found in laboratory records, according to one embodiment The OCSR module 108 may extract chemical entity information and/or reaction metadata from degraded, low-resolution, and/or noisy archival images. The OCSR module 108 may convert such information into standardized and structured digital formats to support computational analysis, improve searchability, and/or enable linkage to public and/or proprietary chemical databases. The OCSR module 108 may then pass the resulting structured chemical data to a downstream module for contextual mapping, experimental record generation, and/or AI inference, according to one embodiment.

The NLP engine 110 may be a natural language processing module configured to analyze the machine-readable text extracted by the OCR module 106 for a scientific context and metadata. The NLP engine 110 may perform named entity recognition (NER) to identify chemical entities, experimental parameters, reaction conditions, and/or outcomes described in the historical lab notebooks 102. The NLP engine 110 may utilize syntactic parsing and a domain-specific language model to extract semantic roles such as reactants, products, catalysts, and/or solvents from procedural descriptions. The NLP engine 110 may also tag relevant experimental descriptors such as concentrations, yields, temperatures, and/or procedural steps. The NLP engine 110 may align this textual information with the corresponding chemical structure(s) identified by the OCSR module 108. The NLP engine 110 may construct semantically rich and/or graph-based knowledge representations that support downstream modules in AI model training, structured data integration, and/or context-aware inference, according to one embodiment.

The correlation module 112 may be a semantic matching and alignment engine configured to associate chemical structures identified by the OCSR module 108 with contextual textual information extracted by the OCR module 106 and the NLP engine 108. The correlation module 112 may determine which segments of text describe specific molecules, link reaction steps with visual diagrams, and/or reconstruct full experimental pathways by associating reactants, intermediates, and products. The correlation module 112 may perform cross-modal alignment to unify molecular depictions with procedural descriptions within the historical laboratory notebook 102. The correlation module 112 may utilize rule-based logic, similarity scoring, and/or machine learning models trained on experimental documentation to infer chemical roles, conditions, and observed outcomes. The correlation module 112 may generate structured experimental records in which each compound is indexed along with its associated role, procedural context, and/or result. The correlation module 112 may output coherent, queryable datasets suitable for ingestion into the structured knowledge base 114, thereby supporting downstream AI reasoning, retrieval, and data integration, according to one embodiment.

The structured knowledge base 114 may be a graph-indexed, queryable archive of structured chemical and experimental metadata derived from the historical lab notebook 102. The structured knowledge base 114 may store chemical compounds as nodes and their associated reactions, roles, and outcomes as edges within a semantic graph and/or ontology framework. The structured knowledge base 114 may be indexed using chemical identifiers, substructure patterns, textual keywords, and/or experimental parameters to support fast and contextual retrieval. The structured knowledge base 114 may integrate data extracted from upstream modules such as the OCR module 106 and the OCSR module 108, consolidating handwritten textual content and graphical molecular structures into a unified representation. The structured knowledge base 114 may support computational reasoning by serving as a reference library and/or training dataset for a predictive AI model. The structured knowledge base 114 may enable insight generation, hypothesis formulation, and/or virtual experimentation by allowing the users 132 and systems to explore relationships, infer missing connections, and retrieve relevant experimental precedents from the graph-indexed data store, according to one embodiment.

The AI model 116 may be a domain-specific artificial intelligence engine, such as a transformer-based large language model integrated with chemical informatics capabilities, designed to learn and replicate the scientific reasoning found in the historical lab notebooks 102. The AI model 116 may be fine-tuned on the structured data extracted through the system's upstream modules, including text from the OCR module 106, chemical structures from the OCSR module 108, contextual metadata from the NLP engine 110, and entity-structure correlations from the correlation module 112, all stored in the structured knowledge base 114. Operating within the private cloud/on-premises network 130, the AI model 116 may process authenticated user queries received via the access point 126 by embedding both textual and chemical structure information, retrieving relevant records, and generating context-aware insights. These insights may be enhanced through reasoning by the AI inference engine 118, optionally combined with predictive analytics from the reaction outcome and condition predictor 122, before being delivered back to the user interface 128 with explanations and citations to the original experimental sources, according to one embodiment.

The AI inference engine 118 may be a reasoning module configured to generate scientific insight, respond to natural language queries, and simulate researcher-like predictions using structured data derived from the historical lab notebooks 102. The AI inference engine 118 may operate by leveraging fine-tuned large language models trained on chemical, biological, and experimental corpora. The AI inference engine 118 may reference structured data within the knowledge base 114 to interpret metadata, molecular structures, procedural annotations, and experimental outcomes extracted by upstream modules such as the OCR module 106 and the OCSR module 108. The AI inference engine 118 may analyze prior experimental strategies to predict reaction outcomes, identify chemical relationships, and infer missing and/or ambiguous experimental information. The AI inference engine 118 may return responses that include explanatory text, predictive suggestions, and citations that trace back to original notebook content. The AI inference engine 118 may function as a virtual assistant to support scientific reasoning, hypothesis development, and decision-making in domains such as drug discovery, materials science, and laboratory research, according to one embodiment.

The processors and memory 120 may serve as the hardware and computational core configured to execute the full software stack of the AI-based knowledge extraction and reasoning system. The processors and memory 120 may support the OCR module 106 and the OCSR module 108 for converting handwritten text and molecular structures into structured digital data, and may execute the NLP engine 110 and the correlation module 112 to extract and relate contextual information. The processors and memory 120 may handle indexing into the structured knowledge base 114 and may run the AI model training module 116 to refine recognition performance. The processors and memory 120 may also power the AI inference engine 118 to deliver real-time responses and predictions through the user interface 128. These components may be optimized with GPU acceleration and in-memory indexing to support high-throughput processing and low-latency access, according to one embodiment.

The prediction engine 122 may be a computational module designed to generate predictive insights based on the structured knowledge base 114 and outputs from the AI inference engine 118. The prediction engine 122 may analyze previously extracted experimental records, molecular structures, reaction pathways, and contextual metadata to forecast future outcomes, suggest next-step experiments, and/or identify likely compound behaviors. The prediction engine 122 may help researchers prioritize experimental directions, reduce trial-and-error cycles, and accelerate scientific discovery by leveraging historical patterns and AI-driven generalization, according to one embodiment.

The data storage subsystem 124 may be a persistent data layer configured to retain raw and/or processed digital artifacts generated throughout the chemical knowledge extraction workflow. The data storage subsystem 124 may store scanned historical lab notebook images, OCR and/or OCSR outputs, NLP annotations, correlation results, structured experiment records, and empirical measurement data such as spectra and/or assay results. The data storage subsystem 124 may support features including auditability, version tracking, and incremental updating as new notebooks are periodically ingested. The data storage subsystem 124 may serve as the foundational infrastructure supporting the structured knowledge base 114 and enabling downstream processes such as AI model training and inference. By maintaining a comprehensive and traceable record of all data artifacts, the data storage subsystem 124 may facilitate robust analysis, reproducibility, and ongoing model refinement, according to one embodiment.

The authenticated access point 126 may be a security and user authentication gateway to manage and/or restrict access to the AI-powered system and the structured knowledge base 114. The authenticated access point 126 may control access permissions for researchers, administrators, and/or computational agents interacting with system resources. The authenticated access point 126 may enforce organizational policies related to data confidentiality, integrity, and provenance by ensuring that only authorized users can upload, modify, and/or query experimental records. The authenticated access point 126 may also regulate how the AI inference engine 118 operates, ensuring that its functions remain within defined access boundaries and compliance rules, according to one embodiment.

The user interface 128 may be an interactive portal configured to enable real-time engagement between researchers and the AI inference engine 118. The user interface 128 may support natural language queries, structure-based chemical searches, experimental record retrievals, and exploratory research workflows. The user interface 128 may display responses with transparent explanations, confidence scores, and links to relevant excerpts from original lab notebooks, allowing researchers to validate and refine AI-generated insights. By offering contextual understanding within active research and/or planning efforts, the user interface 128 may help foster trust and interpretability in AI-assisted chemical discovery, according to one embodiment.

The private cloud/on-premises network 130 may be a secure, organization-controlled infrastructure configured to host the full AI-powered chemical inference system while safeguarding proprietary scientific data. The private cloud/on-premises network 130 may ensure data privacy and regulatory compliance by isolating lab notebook content and AI models from external networks. The private cloud/on-premises network 130 may also support controlled training workflows and internal-only deployments of sensitive models. Furthermore, it may enable integration with existing digital lab systems such as electronic lab notebooks (ELNs), laboratory information management systems (LIMS), and internal AI tooling, establishing a cohesive and secure digital backbone for enterprise-scale chemical research and development, according to one embodiment.

The user 132 may be a researcher, chemist, and/or scientific investigator who interacts directly with the AI-powered chemical knowledge extraction and inference system 100. The user 132 may engage with the system through the user interface 128, submitting scientific questions, chemical structure queries, and/or experiment-related prompts. This interaction may initiate a secure session via the authenticated access point 126, enabling the user 132 to access AI-generated insights derived from the digitized historical lab notebooks 102, according to one embodiment.

Once a query is submitted, the system may activate the AI inference engine 118, which draws upon the structured knowledge base 114 and other backend modules, such as the reaction outcome and condition predictor 122 and the processors and memory 120, to interpret the user's 132 request. The result may be a contextual, traceable response grounded in OCR, OCSR, and NLP-processed data originally extracted from handwritten scientific records. Through this architecture, the user 132 may receive answers, predictions, and/or explanations based on historical precedent, structured metadata, and predictive modeling, according to one embodiment.

Figure 2:
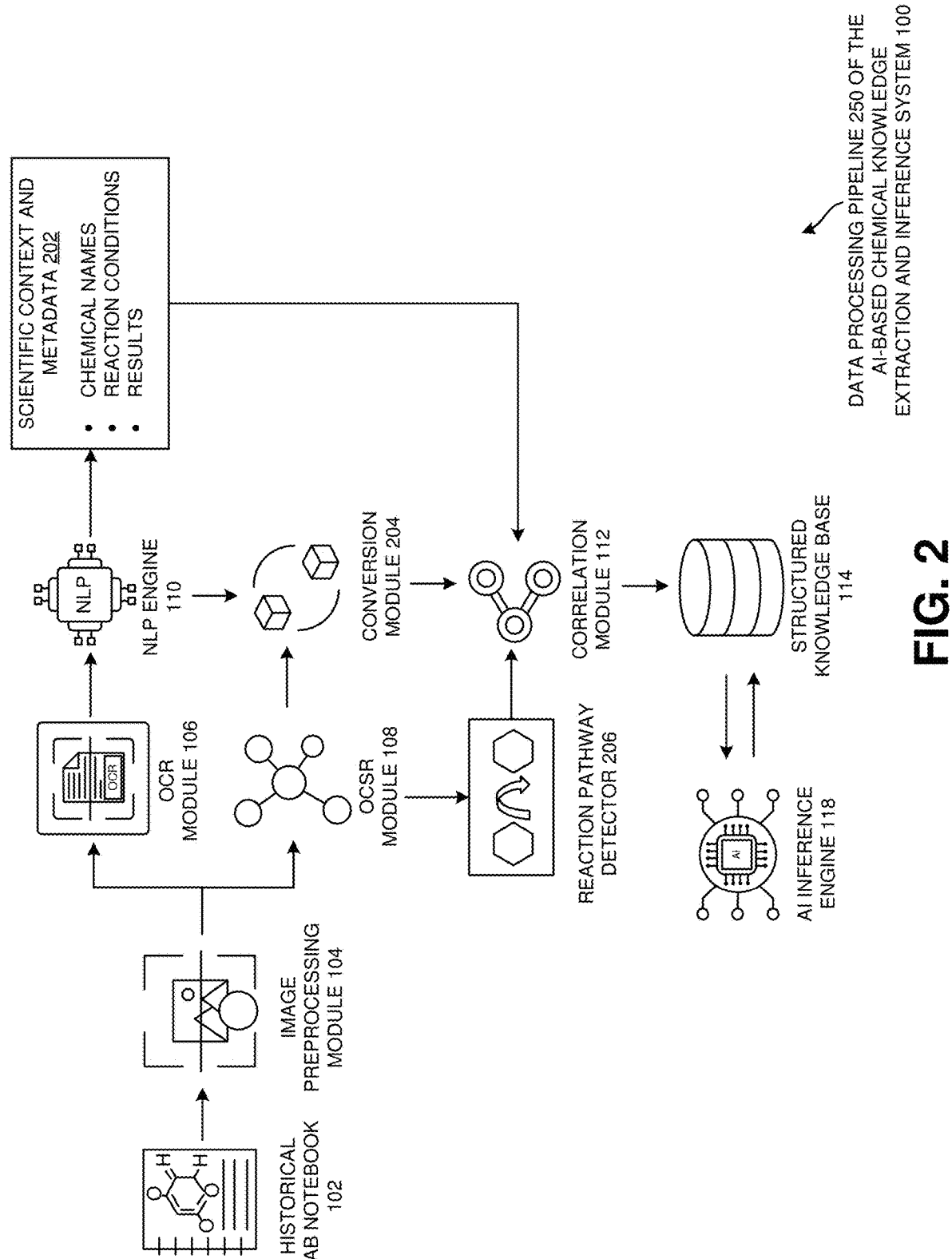
FIG. 2 is a data processing pipeline view of the AI-based chemical knowledge extraction and inference system of FIG. 1, illustrating the sequential transformation of scanned lab notebooks using OCR, OCSR, NLP, and correlation modules to produce structured chemical records, according to one embodiment.

FIG. 2 is a data processing pipeline view 250 of the AI-based chemical knowledge extraction and inference system 100 of FIG. 1, according to one embodiment. FIG. 2 illustrates the historical lab notebook 102, the image pre-processing module 104, the OCR module 106, the OCSR module 108, the NLP engine 110, the correlation module 112, the structured knowledge base 114, the AI inference engine 118, a scientific context and metadata component 202, a conversion module 204, a reaction pathway detector 206, according to one embodiment.

The scientific context and metadata 202 may extract, organize, and/or annotate key experimental entities and parameters from handwritten content within historical lab notebooks 102. The scientific context and metadata 202 may be generated by the NLP engine 110 through natural language processing techniques such as named entity recognition and relationship extraction. The scientific context and metadata 202 may include information such as chemical names, reaction conditions, experimental actions, and results, and may be used to tag and contextualize hand-drawn chemical structures identified by the OCSR module 108. This metadata may be routed through the conversion module 204 for formatting into standardized fields, and further transmitted to the correlation module 112 for alignment with structural data, thereby enabling construction of a semantically rich, searchable, and analyzable structured knowledge base 114. The scientific context and metadata 202 may support advanced functions such as chemical role determination, inference generation, and predictive analysis through the AI inference engine 118, according to one embodiment.

The conversion module 204 may be a transformation subsystem in the data processing pipeline 250 responsible for unifying heterogeneous outputs from the NLP engine 110 and OCSR module 108 into standardized digital formats suitable for computational analysis and integration. The conversion module 204 may process extracted textual entities and chemical diagrams by generating canonical representations such as SMILES strings, InChI identifiers, and molecular graphs for chemical structures, while simultaneously encoding textual outputs into structured field categories including reagent identity, reaction yield, and procedural annotations. The conversion module 204 may serve as the normalization engine that ensures interoperability across modules, reduces ambiguity in chemical and linguistic data, and supports semantic linking in the correlation module 112. The output of the conversion module 204 may be essential to forming machine-readable experiment records that populate the structured knowledge base 114 and drive inference by the AI inference engine 118, according to one embodiment.

The reaction pathway detector 206 may be a specialized module in the data processing pipeline 250 configured to reconstruct multi-step chemical reactions from visual and textual patterns captured in historical lab notebooks 102. The reaction pathway detector 206 may analyze spatial arrangements, chemical connectivity, and contextual cues such as reaction arrows, proximity of molecules, and/or procedural descriptions to detect sequences of transformations between chemical compounds. Each identified compound may be assigned a functional role such as reactant, intermediate, and/or product, and linked in a directional path to represent the overall reaction scheme. The reaction pathway detector 206 may then encode these pathways into graph-based data structures that are validated against metadata from the scientific context 202 and aligned via the correlation module 112. These structured reaction pathways may be stored within the structured knowledge base 114 and used by the AI inference engine 118 to simulate synthetic routes, predict outcomes, and/or provide explanations based on historical experimental logic, according to one embodiment.

Figure 3:
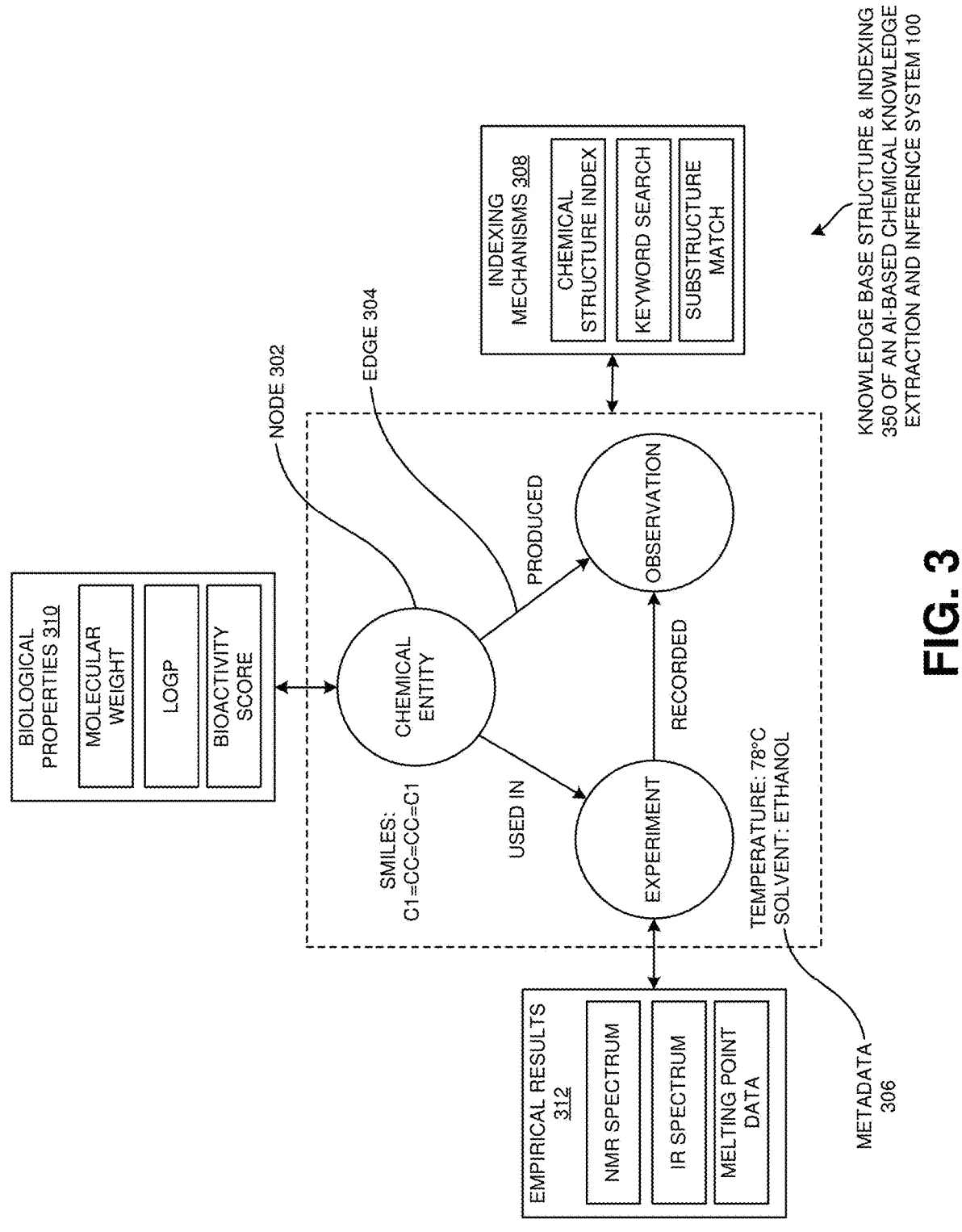
FIG. 3 is a knowledge base structure and indexing view of the AI-based chemical knowledge extraction and inference system of FIG. 1, illustrating the graph-based organization of chemical entities, experimental observations, and searchable metadata in the structured knowledge base, according to one embodiment.

FIG. 3 is a knowledge base structure and indexing view 350 of the AI-based chemical knowledge extraction and inference system 100 of FIG. 1, according to one embodiment. FIG. 3 illustrates a chemical entity node 302, a relationship edge 304, experimental metadata 306, an indexing mechanism 308, an additional chemical property 310, and an empirical result 312, according to one embodiment.

The chemical entity node 302 may be a core element of the structured knowledge base 114 configured to represent a distinct chemical compound identified within the historical lab notebook 102. The chemical entity node 302 may be derived from molecular structures recognized by the OCSR module 108 and standardized via the conversion module 204 into formats such as SMILES strings, InChI identifiers, and/or graph-based representations. The chemical entity node 302 may serve as an anchor point in the semantic knowledge graph, linking chemical structures to relevant metadata 306, including reaction conditions and solvent types, as well as to related experiment and observation nodes, according to one embodiment.

The chemical entity node 302 may be associated with the additional properties 310, including molecular weight, log P, and/or bioactivity scores, which may enrich the contextual information stored within the chemical entity node 302. The chemical entity node 302 may connect to experiment and observation nodes to express its role within documented procedures. The chemical entity node 302 may also interface with the empirical results 312 (e.g., NMR spectra or melting point data) and the indexing mechanisms 308 (e.g., sub-structure match or keyword search), enabling the AI inference engine 118 to reason over and retrieve chemically meaningful patterns. The chemical entity node 302 may support advanced querying, inference, and discovery across structured experimental archives, according to one embodiment.

The relationship edge 304 may be a semantic connector between nodes in the structured graph that encodes a directional and/or contextual link between elements such as chemical compounds, experiments, and results. The relationship edge 304 may be generated by the correlation module 112, which may analyze spatial proximity, sentence structure, and role indicators in the historical lab notebooks 102 to determine meaningful relationships such as "used as reactant," "produced as product," and/or "associated with yield." The relationship edge 304 may establish a logical structure that binds chemical entity nodes 302 to surrounding events and observations, enabling graph traversal and AI interpretation of reaction steps. The relationship edge 304 may also support reconstruction of full experimental pathways and role-based tagging of compounds to the reaction pathway detector 206 and experimental reconstruction, according to one embodiment.

The metadata 306 may be a contextual layer of experimental parameters extracted from handwritten or scanned text of historical lab notebooks 102. The metadata 306 may include values such as temperature, pressure, solvent, stirring rate, or procedural notes and may be recognized by the NLP engine 110 and normalized by the conversion module 204. Once extracted, the metadata 306 may be associated with both the relevant chemical entity nodes 302 and experiment records in the knowledge graph to provide environmental context. These parameters may allow the system to replicate experimental conditions in silico or propose optimized variations, and may be used during inference to filter or prioritize experimental outcomes based on similar contextual setups, according to one embodiment.

The indexing mechanisms 308 may be specialized subsystems within the structured knowledge base 114 designed to enable rapid search and semantic retrieval of chemical and experimental information. These mechanisms may include a chemical substructure index, a keyword-based inverted text index, and a fingerprint-based similarity engine. The indexing mechanisms 308 may be populated during the knowledge base generation process using normalized outputs from the conversion module 204 and structured records generated by the correlation module 112. These indices may enable users to retrieve experiments by querying molecular substructures, text annotations, or metadata fields, and may support integration with electronic lab notebooks (ELNs) and AI interfaces to drive real-time discovery, according to one embodiment.

The additional properties 310 may comprise computed and/or referenced chemical and biological attributes that augment each recognized chemical structure stored within the structured knowledge base 114. The additional properties 310 may include calculated values such as molecular weight, Log P, and pKa, as well as bioactivity data such as binding affinity and/or toxicity scores. These attributes may be derived from cheminformatics algorithms and/or retrieved from external chemical databases during postprocessing. The additional properties 310 may be linked to the chemical entity nodes 302 to enhance predictive accuracy, support compound prioritization, and assist in decision-making during hypothesis generation and/or experiment planning, according to one embodiment.

The empirical results 312 may represent observational data captured during experimental execution, such as melting points, NMR spectra, IR spectra, yields, and chromatographic measurements. The empirical results 312 may be extracted from pages of the historical lab notebook 102 through the OCR module 106 and/or image parsing, or imported from digital instrument files embedded within the electronic lab notebook and/or appended later. Once recognized, these results may be linked to the appropriate experiment records, chemical structures, and metadata using the correlation module 112. The empirical results 312 may serve as the factual ground truth for AI validation, which may enhance transparency by supporting explainability, and improve the predictive quality of the AI inference engine 118 by incorporating outcome-based learning, according to one embodiment.

Figure 4:
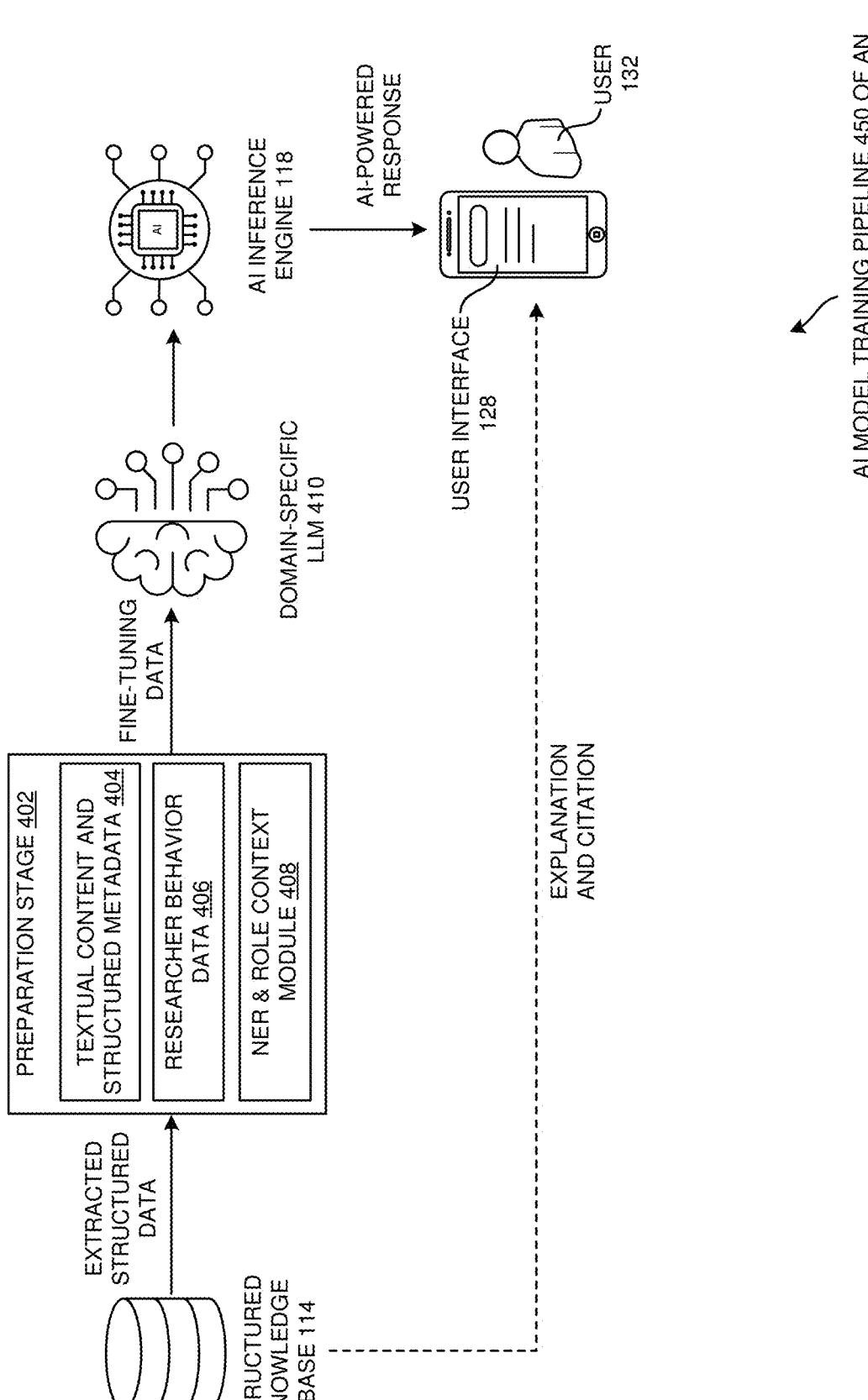
FIG. 4 is a model training pipeline view of the AI-based chemical knowledge extraction and inference system of FIG. 1, illustrating the configuration of a scientific reasoning AI model trained using structured records derived from historical lab notebooks, according to one embodiment.

FIG. 4 is an AI model training pipeline view 450 of the AI-based chemical knowledge extraction and inference system 100 of FIG. 1, according to one embodiment. FIG. 4 illustrates the structured knowledge base 114, the AI inference engine 116, the user interface 128, the user interface 132, a preparation stage 402, a textual content and structured metadata 404, a researcher behavior data 406, a fine-tuning domain-specific model 410, according to one embodiment.

The preparation stage 402 may be a preprocessing layer within the AI model training pipeline configured to organize and structure extracted data from the structured knowledge base 114. The preparation stage 402 may consolidate digitized outputs previously generated through the OCR module 106, the OCSR module 108, and the NLP engine 110 applied to historical lab notebooks 102, including recognized text, chemical structures, and/or metadata. The preparation stage 402 may normalize, validate, and/or segment the recognized content into discrete experimental records, establishing clear contextual boundaries and formatting consistency. This process may ensure clean, structured input for downstream training and fine-tuning, enabling the AI model to learn from scientifically coherent and context-rich datasets, according to one embodiment.

The textual content and structured metadata 404 may represent a unified data layer that combines recognized language outputs and relational context derived from the NLP engine 110 and the correlation module 112. This layer may include extracted chemical entities, procedural steps, result metrics, and key experimental parameters such as temperature, solvent, catalyst, and/or yield. These textual elements may be contextually linked to chemical structures identified by the OCSR module 108, forming semantically enriched associations. The textual content and structured metadata 404 may serve as the core substrate of the structured knowledge base 114, providing the labeled, context-aware scientific records needed to train the fine-tuning domain-specific model 410. This layer enables the model to interpret real-world experimental documentation and learn from the language, logic, and structure of the historical lab notebooks 102, according to one embodiment.

The researcher behavior data 406 may be a specialized data layer that captures historical experimentation styles and decision-making patterns exhibited by scientists in their handwritten lab notebooks 102. The researcher behavior data 406 may include features such as commonly selected reaction pathways, frequently used reagents, annotation habits, and/or recurring sequences in experimental planning. The researcher behavior data 406 may be derived from the textual content and structured metadata 404 and enriched through analysis by the correlation module 112 and the AI inference engine 118. By modeling these behavioral patterns, the artificial intelligence-based chemical knowledge extraction and inference system 100 may simulate individual and/or group-level scientific reasoning, allowing the fine-tuning domain-specific model 410 to generate more human-like responses and anticipate likely experimental directions. This behavioral dimension enhances the personalization and contextual relevance of outputs generated by the fine-tuning domain-specific model 410 during inference, according to one embodiment.

The NER & Role Context Module 408 may be a functional component of the training pipeline configured to execute Named Entity Recognition (NER) and experimental role attribution using combined signals from the NLP engine 110 and the textual content and structured metadata 404. The NER & Role Context Module 408 may extract and classify scientific entities from the digitized historical lab notebooks 102, identifying terms such as chemical names, experimental actions (e.g., "heated," "filtered"), and result indicators (e.g., "yield," "precipitate"). The NER & role context module 408 may assign contextual roles to each identified chemical, such as reactant, product, catalyst, and/or solvent, by analyzing linguistic patterns and spatial relationships present in the original scanned records. These role-based annotations may enrich the semantic structure of the training data, which may enable the downstream fine-tuning domain-specific model 410 to simulate scientific reasoning and generate contextually informed AI-powered responses to user queries, according to one embodiment.

The fine-tuning domain-specific model 410 may be an AI engine configured to simulate scientific reasoning based on the structured knowledge derived from the historical lab notebooks 102. The fine-tuning domain-specific model 410 may be trained using integrated inputs from the preparation stage 402, the textual content and structured metadata 404, the researcher behavior data 406, and the contextual annotations generated by the NER & role context module 408. The fine-tuning domain-specific model 410 may be implemented using transformer-based large language models that are initially pre-trained on general-purpose corpora and then fine-tuned using the domain-specific structured knowledge base 114. This fine-tuning process may allow the model to internalize scientific terminology, procedural logic, and experimental nuances required for advanced tasks such as drug discovery, hypothesis evaluation, and/or context-sensitive question answering. Once trained, the fine-tuning domain-specific model 410 may operate as the primary inference engine, capable of generating scientifically grounded insights, predictive outcomes, and rationale explanations in response to queries submitted by the user 132 through the interactive user interface 128, according to one embodiment.

FIG. 5 is an interactive user interface view 550 of the AI-based chemical knowledge extraction and inference system 100 of FIG. 1, according to one embodiment. FIG. 5 illustrates a project title bar 502, a user input area 504, a natural language query input 506, a structure-based query 508, a main content area 510, an AI model response 512, a knowledge graph, a citation 516, and an AI suggestion 518, according to one embodiment.

The project title bar 502 may be a display element integrated into the interactive user interface 550 to provide persistent contextual framing for the user's analytical and/or exploratory session. The project title bar 502 may present identifying information about the current dataset, the historical lab notebook 102 collection, and/or research project, such as "Project Discovery-Confidential", to help maintain clarity about the data scope and/or sensitivity. Positioned prominently at the top of the user interface 128, this component may serve as a navigational anchor, ensuring continuity as the users 132 engage in hypothesis testing, AI-assisted queries, and/or review of chemical structures and experimental records. The project title bar 502 may also support additional metadata display, including internal version identifiers and/or collaboration status, thereby helping researchers remain aligned with project goals and maintain orientation across multiple interface views, according to one embodiment.

The user input area 504 may be a composite interaction zone within the interactive user interface 550, designed to enable direct engagement between the researcher and the AI model trained on structured chemical knowledge extracted from historical lab notebooks. This input area may serve as the primary entry point for initiating queries, prompting data retrieval, or validating hypotheses grounded in experimental history. The user input area 504 may include two functional subcomponents: the natural language query input 506, which may allow researchers to pose questions using free-form scientific language (e.g., "What solvents were used with compound X in 1998 experiments?"), and the structure-based query input 508, which may allow the users 132 to draw and/or upload chemical structures for tasks such as substructure matching, retrosynthesis proposals, or analog searching. These modalities may operate independently or in tandem, enabling flexible, multimodal search behavior. By combining linguistic and molecular-level inputs, the user input area 504 may offer a versatile interface for engaging with AI-extracted scientific insights through both semantic context and structural representation, according to one embodiment.

The natural language query input 506 may provide a free-text interface within the interactive user interface 550 that allows the users 132 to type scientific questions and/or prompts directed to an AI model fine-tuned on content extracted from the historical lab notebooks 102. The Natural language query input 506 may function as a semantic bridge between the user 132 and the structured knowledge base 114, which may enable intuitive, conversational engagement without requiring specialized syntax and/or database query skills. The natural language query input 506 may support open-ended questions such as "What happens if I replace PDC with NI?" and may, upon submission, trigger a downstream inference pipeline. The AI engine may parse the query, identify relevant chemical substitutions, assess contextual metadata, and generate scientifically grounded responses based on the structured experiment records. The natural language query input 506 may empower researchers to probe past experiment outcomes, investigate mechanistic hypotheses, and/or uncover hidden correlations using familiar language, thereby democratizing access to complex scientific archives, according to one embodiment.

The structure-based query input 508 may be a dedicated subcomponent of the interactive user interface 550 designed to enable the users 132 to submit chemically structured queries using molecular representations. This input interface may support both graphical uploads and text-based formats, including MDL, SDF, SMILES (Simplified Molecular Input Line Entry System), InChI (International Chemical Identifier), and/or graph-based encodings. The structure-based query input 508 may empower researchers to perform substructure and similarity searches against the AI-indexed archive of compounds extracted from historical lab notebooks 102. Upon receiving a query, the system may retrieve records containing matching and/or analogous molecular patterns, revealing associated reaction conditions, experimental roles, and/or observed outcomes. For instance, the user 132 submitting a ligand's SMILES string may uncover that the compound acted as a catalyst under acidic conditions in a 1997 synthesis trial. This tool may serve as a cornerstone for structure-activity relationship (SAR) discovery, helping researchers refine analogs, predict functionality, and design follow-on experiments grounded in empirical precedent captured in the structured knowledge base 114, according to one embodiment.

The main content area 510 may be the central result-rendering region of the interactive user interface 550, configured to present AI-generated outputs in a coherent and user-centric layout. This zone may act as the focal display layer where multiple forms of content, including textual explanations, visual graphs, citations, and/or molecular structures, are brought together for interpretation and decision-making. The main content area 510 may be dynamically populated in response to user inputs from the query inputs 506 and 508, and may facilitate downstream interaction with elements such as the AI response 512, the knowledge graph 514, the citation 516, and the AI suggestion 518. The area may support real-time or asynchronous updates, which may allow the users 132 to remain in a continuous loop of scientific inquiry and feedback while analyzing compound behavior, experiment design, or model-driven insights, according to one embodiment.

The AI response 512 may be a natural-language output constructed by the domain-specific AI model 410 in response to a user query entered by the user 132 through the natural language query input 506 and/or structure-based query input 508. The AI response 512 may synthesize information retrieved from the structured knowledge base 114, which itself was built from OCR, OCSR, and NLP processing pipelines. This AI response 512 may serve as an explanation, prediction, and/or hypothesis relevant to the question posed. For example, when asked about the viability of a compound replacement, the AI response 512 may state, "Replacing compound PDC with NI may reduce yield due to increased steric hindrance," citing prior experiments extracted from historical lab notebooks 102. This layer may serve as a bridge between structured data and human reasoning, delivering high-level synthesis grounded in empirical precedent and contextual relevance, according to one embodiment.

The knowledge graph 514 may be a dynamic visualization layer within the interactive user interface 550, designed to represent interconnected scientific concepts extracted from the historical lab notebook 102. The knowledge graph 514 may be automatically generated from the structured knowledge base 114, which aggregates experimental metadata, chemical structures, reaction roles, and outcome annotations processed by the upstream OCR module 106, the OCSR module 108, and the NLP engine 110. Each node in the knowledge graph 514 may correspond to an experimental entity such as a reactant, product, catalyst, condition, and/or result metric, while each edge may encode a defined semantic and/or experimental relationship such as "used in," "produced by," and/or "associated with.". This representation may enable the users 132 to visually trace chemical pathways, reveal latent connections between experiment sets, and analyze structural variations that correlate with shifts in observed outcomes. Interactive features may include node-hover tooltips, edge filters, and/or click-to-expand pathways, supporting an exploratory mode of inquiry grounded in empirical history, according to one embodiment.

The citation 516 may serve as a traceability anchor linking AI-generated responses back to their originating context in the historical lab notebooks 102. The citation 516 may appear as a footnote, tag, and/or embedded hyperlink, e.g., "Lab Notebook #231, Page 7," and may reference the precise source document and/or image snippet that informed a given prediction and/or explanation. The citation 516 may help ensure transparency and auditability of model outputs by enabling researchers to cross-check AI interpretations against original experimental evidence. The citation 516 may be programmatically linked to internal document vaults 706 that store scanned and/or digitized notebook pages, thereby closing the loop between inference and provenance. This layer may support regulated research workflows where explanation validity and historical verification are essential, according to one embodiment.

The AI suggestion 518 may be a prescriptive analytics output generated by the fine-tuned domain-specific model 410 based on historical pattern recognition, co-occurrence trends, and contextual cues from the user's 132 current query. This element may proactively surface alternative hypotheses, experimental next steps, or flagged insights derived from previously annotated lab notebooks. For instance, if the user 132 inquires about a low-yield reaction setup, the AI suggestion 518 may respond, "Try replacing the catalyst with $PdCl_2$ based on Notebook #192." This element may reflect the system's ability to offer action-oriented insights grounded in prior discovery cycles. These suggestions may help accelerate iteration, prevent redundant experimentation, and/or drive hypothesis refinement, thereby serving as a virtual collaborator within the AI-powered research assistant, according to one embodiment.

Figure 6:
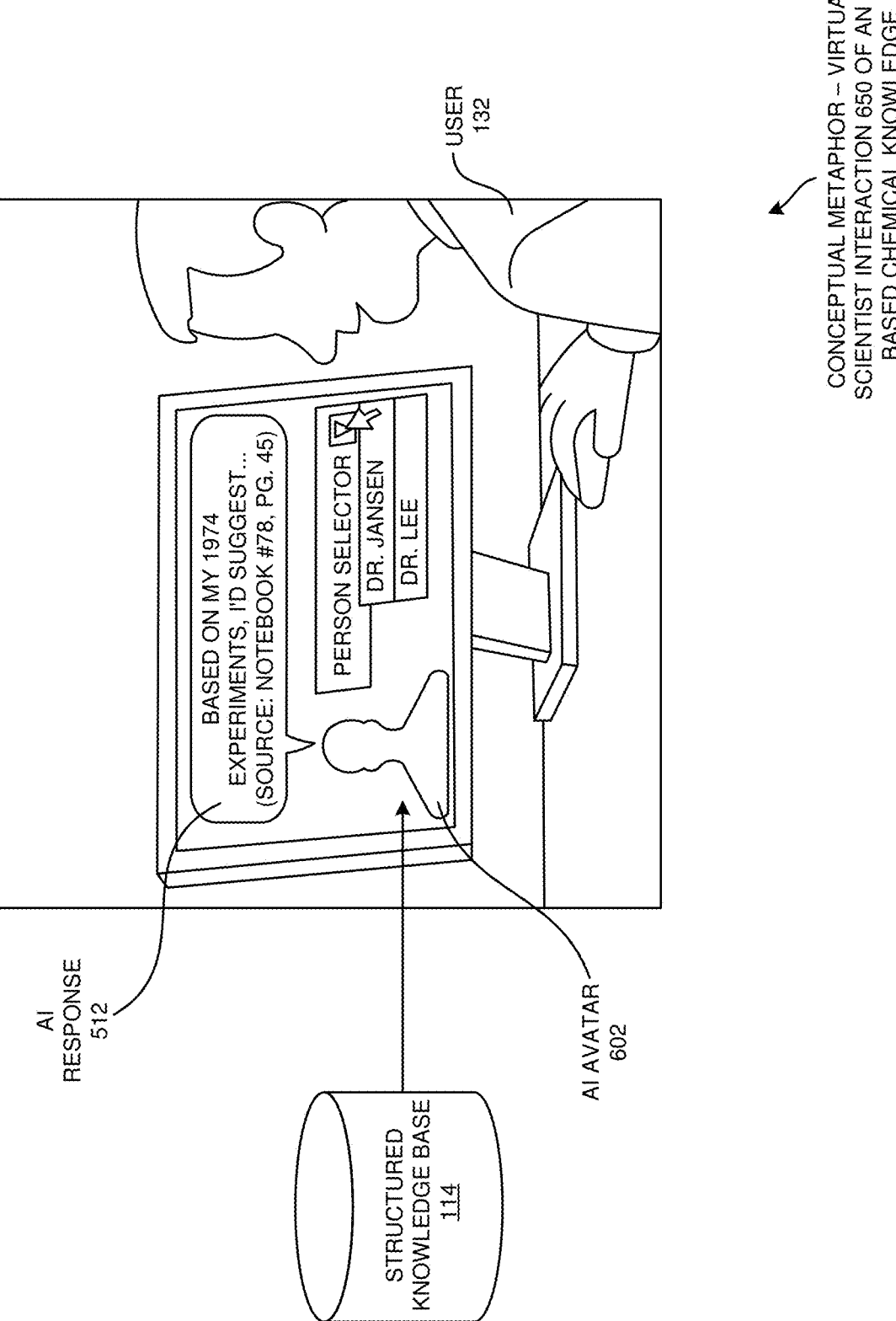
FIG. 6 is a conceptual metaphor view illustrating user interaction with a virtual scientist agent within the AI-based chemical knowledge extraction and inference system of FIG. 1, according to one embodiment.

FIG. 6 is a conceptual metaphor view 650 depicting a virtual scientist interaction within the AI-based chemical knowledge extraction and inference system 100 of FIG. 1, according to one embodiment. FIG. 6 illustrates the structured knowledge base 114, the user 132, the AI response 512, and an AI avatar 602, according to one embodiment.

The AI Avatar 602 may be a virtualized graphical agent designed to simulate the reasoning and communication style of a historical scientist whose lab notebooks were used to train the AI system. It may appear as an interactive character on-screen and may serve to contextualize AI-generated responses with narrative continuity and researcher-specific tone. The AI Avatar 602 may personalize the interaction and may bridge the past and present by making data from the historical lab notebook 102 conversationally accessible to the modern users 132, according to one embodiment.

The AI Avatar 602 may enter the process as a visual and interactive representation of a historical scientist, appearing within the user interface once the user 132 selects a persona (e.g., "Dr. Jansen") via the person selector option. The AI Avatar 602 may not just represent a stylistic choice; it may actively guide the interaction by framing AI-generated responses as if coming from that historical researcher, according to one embodiment.

The AI Avatar 602 may be linked to structured knowledge in the structured knowledge base 114, which may be built from the historical lab notebooks 102 using the OCR module 106, the OCSR module 108, and the NLP engine 110. When the user 132 may input a query through the user interface 128, the system may pull relevant records from the knowledge base and may route them through a fine-tuned domain-specific model 410, according to one embodiment.

The AI response 512 may then be presented as a statement from the AI Avatar 602, sometimes citing the original historical source (e.g., "Notebook #78, Pg. 45"). This may reinforce trust, transparency, and historical continuity, giving the users 132 the sense that they may be interacting not with a generic AI, but with a virtual embodiment of an actual prior researcher, trained on that scientist's historical data and style of reasoning, according to one embodiment.

Figure 7:
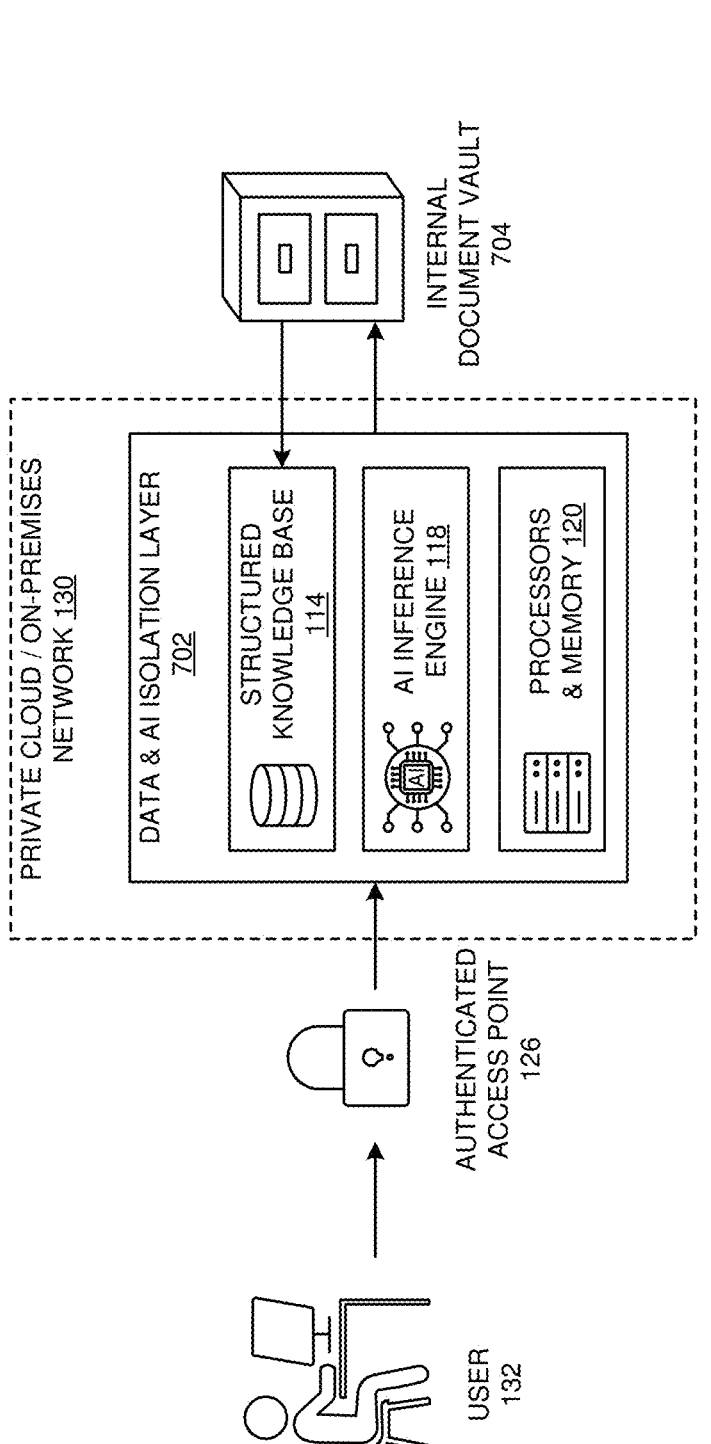
FIG. 7 is a deployment environment and data security view of the AI-based chemical knowledge extraction and inference system of FIG. 1, illustrating a secure private cloud or on-premises deployment supporting role-based access, data isolation, and vault integration for protecting sensitive lab notebook content, according to one embodiment.

FIG. 7 is a deployment environment and data security architecture view 750 of the AI-based chemical knowledge extraction and inference system 100 of FIG. 1, according to one embodiment. FIG. 7 illustrates the structured knowledge base 114, the AI inference engine 118, the processors and memory 120, the authenticated access point 126, the private cloud/on-premises network 130, the user 132, the data and AI isolation layer 702, and the internal document vault 704, according to one embodiment.

The data and AI isolation layer 702 may serve as a logically and physically secure compute zone within the private cloud/on-premises network 130, enclosing the structured knowledge base 114, AI inference engine 118, and processors and memory 120. The data and AI isolation layer 702 may ensure that all operations, including query processing, model inference, and/or memory execution, remain confined to a secure enclave, safeguarding sensitive experimental data and model logic. When the user 132 submits a request, it may enter this layer where the AI inference engine 118 may process it using contextual and chemical information stored in the structured knowledge base 114, which itself was generated from the digitized historical lab notebooks 102. The processing workflow, including intermediate caching, transformation, and reasoning, may be fully encapsulated within this isolation boundary. Only final outputs (e.g., predictions, citations, or AI responses) may exit the layer and be returned to the user 132, according to one embodiment.

The internal document vault 704 may serve as a secure archival system for storing original materials from the historical lab notebook 102, including scanned handwritten records, chemical diagrams, and raw experiment notes. The internal document vault 704 may act as the authoritative source of scientific evidence, supporting upstream the OCR 106, the OCSR 108, and the NLP engine 110 responsible for extracting structured information. These extracted records may be linked to the structured knowledge base 114 and referenced by the AI inference engine 118 during user interactions. For example, when user 132 asks about the role and/or behavior of a compound, the system may not only generate a structured response but may also cite and trace its inference back to an original scanned notebook page preserved in the internal document vault 704. This enables explainability, traceability, and/or evidence-based confidence in AI-supported scientific discovery, according to one embodiment.

Figure 8:
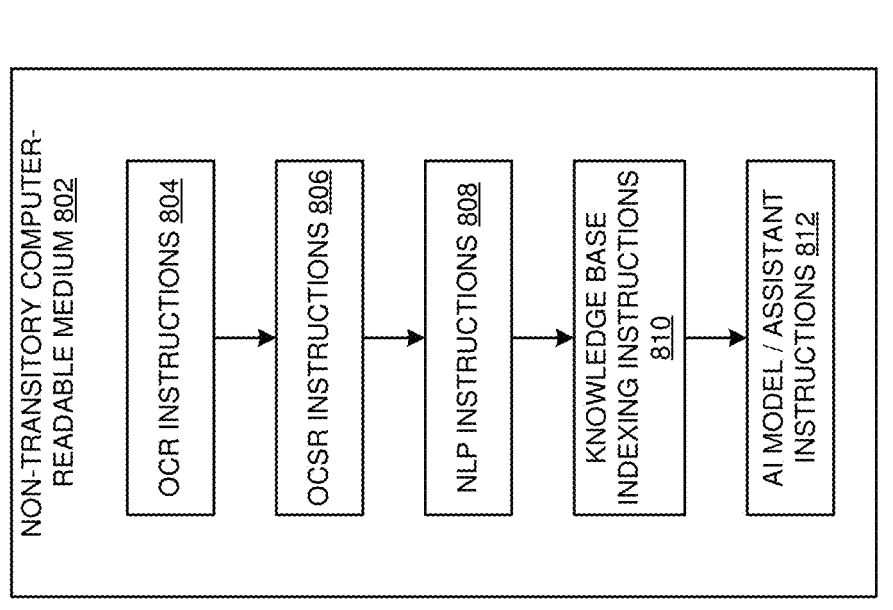
FIG. 8 is a non-transitory computer-readable medium view illustrating software instruction sets stored on the AI-based chemical knowledge extraction and inference system of FIG. 1, illustrating instruction sets stored on a non-transitory computer-readable medium for executing OCR, OCSR, NLP, indexing, and AI model functions in processing lab notebooks, according to one embodiment.

FIG. 8 is a non-transitory computer-readable medium 850 view illustrating software instruction sets stored on the AI-based chemical knowledge extraction and inference system 100 of FIG. 1, according to one embodiment. FIG. 8 illustrates a non-transitory computer-readable medium 802, an OCR instructions 804, an OCSR instructions 806, an NLP instructions 808, a knowledge base indexing instructions 810, and an AI model/assistant instructions 812, according to one embodiment.

The non-transitory computer-readable medium 802 may be a physical storage component, such as a solid-state drive (SSD), hard disk, and/or flash memory, configured to retain the software modules necessary for digitizing, interpreting, and reasoning over the historical lab notebooks 102. It may reside within a secure infrastructure such as the private cloud or on-premises network 130, which may ensure authorized access and traceable execution. The non-transitory computer-readable medium 802 may store sequential software instructions that power the full workflow from document ingestion to AI-powered querying supporting enterprise-level reproducibility and security in scientific research environments, according to one embodiment.

The OCR instructions 804 may be program logic for recognizing and converting handwritten and/or printed text from the scanned historical lab notebook 102 pages into machine-readable form. These instructions may serve as the system's first layer of interpretation, transforming human-written content into digital text that subsequent modules can process. To handle degraded and/or complex handwriting, these routines may be enhanced with machine learning models trained on domain-specific writing samples, improving recognition accuracy and supporting accurate metadata extraction downstream, according to one embodiment.

The OCSR instructions 806 may represent a second stage of digitization logic that identifies and translates hand-drawn chemical structures and reaction schemes into standardized formats such as SMILES, InChI, and/or graph-based molecular models. These instructions may apply image processing and shape recognition techniques to detect molecular diagrams, reaction arrows, and yield annotations. These structures may be linked to experimental roles such as reactants, products, and/or catalysts, which enables them to be connected with adjacent text via downstream NLP processing, according to one embodiment.

The NLP instructions 808 may extract scientific meaning from the machine-readable text produced by OCR. These routines may perform Named Entity Recognition (NER), dependency parsing, and semantic labeling to identify compounds, experimental parameters, and result metrics from the text. This module may link these textual elements with corresponding chemical structures identified via OCSR, enabling a unified semantic understanding of each experiment and capturing the roles, relationships, and conditions present in historical scientific workflows, according to one embodiment.

The knowledge base indexing instructions 810 may organize and tag the structured outputs from OCR, OCSR, and NLP into a searchable and interconnected knowledge base. These routines may generate unique identifiers, populate ontology-based graphs, and encode compound-condition-result linkages that support advanced querying. The structured knowledge may then be stored in the structured knowledge base 114, forming the foundation for downstream AI model training and inference, according to one embodiment.

Finally, the AI model/assistant instructions 812 may enable the training and execution of a domain-specific AI model that simulates scientific reasoning. These instructions may support fine-tuning on experimental narratives and structured chemical records, allowing the AI model/assistant instructions 812 to provide natural language answers, scientific insights, and experimental recommendations in response to user queries from the user 132. The AI model/assistant instructions 812 may cite original sources from the structured knowledge base 114 and support hypothesis generation grounded in real experimental precedent. The AI model/assistant instructions 812 may be hosted within the AI inference engine 118 and accessed via the user interface 128, forming the intelligent core of the interactive system, according to one embodiment.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., data processing device 100). Accordingly, the specification and drawings are to be regarded in an illustrative rather than a restrictive sense.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The invention claimed is:

1. A computer-implemented method, the method comprising:

receiving at least one of a digital image and a scanned page of a historical lab notebook containing a handwritten text and a chemical structure drawing;

performing an optical character recognition (OCR) on at least one of the digital images and the scanned pages to convert the handwritten text in the historical lab notebooks into machine-readable text data;

performing an optical chemical structure recognition (OCSR) on at least one of the digital images and the scanned pages to identify at least one of a hand-drawn chemical structure and a reaction diagram, and translating each identified chemical structure and each associated identified reaction diagram into a standardized digital representation suitable for search and computation;

analyzing recognized text data in at least one of the digital images and the scanned pages with a natural language processing (NLP) engine to extract scientific context and metadata, including identifying at least one of a chemical entity, a reaction condition, an experimental parameter, and results mentioned in the historical lab notebooks;

correlating output of the OCSR module and the NLP engine, by associating each chemical structure with its corresponding textual context from the historical lab notebooks, thereby generating a structured record of experiments that link a chemical compound to experimental details and outcomes;

constructing a structured knowledge base from a structured record, the structured knowledge base comprising an organized collection of chemical information and experimental metadata extracted from the historical lab notebooks, wherein the structured knowledge base is indexed by at least chemical structure identifiers and textual keywords;

at least one of training and configuring an artificial intelligence model using data in the structured knowledge base, such that the artificial intelligence model encodes a representation of scientific knowledge, the historical lab notebooks, and problem-solving behavior reflected in actions taken by a scientist author of each of the historical lab notebooks; and providing an interactive user interface to the artificial intelligence model through which a user can submit at least one query and engage with the artificial intelligence model to obtain at least one of an insight, an explanation, and a prediction related to drug discovery, the artificial intelligence model responding based on information and inferred knowledge derived from the historical lab notebooks.

2. The method of claim 1, wherein performing the optical chemical structure recognition comprises converting each of a detected chemical structure drawing into at least one of a unique textual identifier and coding, including at least one of a SMILES string, an International Chemical Identifier (InChI), and a graph-based data structure representing the molecule's atoms and bonds.

3. The method of claim 1, wherein the natural language processing includes a named entity recognition to identify at least one of a chemical name, an experimental action, a reagent, the reaction condition, and a result metric in the text, and wherein identified entities are used to tag and contextualize corresponding chemical structures in the structured knowledge base.

4. The method of claim 1, further comprising detecting and reconstructing a chemical reaction pathway from the historical lab notebooks by identifying reaction arrows and multiple chemical structures in proximity, and creating structured records that link reactant structures to product structures, along with any associated reaction yield.

5. The method of claim 1, wherein associating each of the chemical structure with its textual context includes determining a role of a chemical in an experiment, the role selected from a group consisting of at least one of a reactant, a product, a catalyst, a solvent, and an intermediate, by analyzing textual cues and placement of the chemical structure in an original notebook diagram.

6. The method of claim 5, further comprising populating the structured knowledge base with additional metadata for each recognized chemical structure by at least one of retrieving and calculating chemical and biological properties for the chemical structure, including molecular weight, physicochemical properties, and known bioactivity data, and storing said properties in association with the chemical structure as part of an experiment record.

7. The method of claim 6, wherein the structured knowledge base is indexed to support substructure and similarity searching, allowing the user to query the structured knowledge base by providing the chemical structure and retrieving all notebook entries in which at least one of a matching and similar structure appears.

8. The method of claim 1, wherein the structured knowledge base is implemented as a graph-based ontology, in which nodes represent at least one of the chemical compounds, experiments, and observations, and edges represent relationships between them, such that the structured knowledge base captures relationships selected from: "compound A was used in experiment X," "compound B was produced in experiment Y," and "experiment Z had outcome result R".

9. The method of claim 1, wherein training the artificial intelligence model comprises fine-tuning a domain-specific large language model on a textual content of the historical lab notebooks and a structured metadata, thereby imparting the artificial intelligence model with an understanding of historical experiments and problem-solving approaches of scientists who authored handwritten lab notebooks.

10. The method of claim 1, wherein the artificial intelligence model is configured to simulate scientific reasoning of at least one of a particular researcher and a group of researchers reflected in the handwritten lab notebooks, such that the artificial intelligence model, in response to a user query, to explain how a past scientist might have at least one approached a current research problem and proposed a rationale based on historical experimentation data.

11. The method of claim 1, further comprising a query interface that accepts natural-language questions from the user regarding at least one of experimental data and a potential new experiment, and wherein the artificial intelligence model to generate at least one of answers and suggestions by referencing the structured knowledge base, thereby enabling interactive dialogue with an agentic scientist.

12. The method of claim 1, wherein a system further utilizes the structured knowledge base to train at least one predictive model that analyzes aggregated historical experiment data to predict outcomes of candidate chemical reactions and to recommend optimal reaction conditions for a given synthetic goal, thereby augmenting the artificial intelligence model with prescriptive analytics capabilities.

13. The method of claim 1,
wherein the method further comprises at least one of extracting and linking such experimental result data, including at least one of NMR spectra, IR spectra, melting points, and other analytical data, to corresponding experiments in the structured knowledge base, so that the artificial intelligence model to consider an empirical result when answering queries, and
wherein the historical lab notebooks include embedded data from instruments, including at least one of spectra, chromatograms, and assay results.

14. The method of claim 1, wherein the OCR module and the OCSR module are trained to handle handwritten and low-quality documents, including variability in handwriting styles and drawing clarity, by using deep neural network models that have been pre-trained and fine-tuned on samples of historical scientific documents, thereby improving recognition accuracy on archival notebook pages.

15. The method of claim 1, wherein the structured knowledge base is maintained in at least one of a secure, private cloud and on-premises environment of an organization, and further wherein the AI model is restricted to using a proprietary notebook data of the organization to train and for inference, thereby preserving confidentiality while leveraging historical data unique to that organization for drug discovery insights.

16. The method of claim 1, further comprising periodically updating the structured knowledge base and updating the artificial intelligence model as new historical lab notebooks become available, thereby creating a persistent, evolving digital knowledge asset that continuously learns from ongoing research and remains up-to-date.

17. The method of claim 1, wherein the interactive interface to provide at least one of an explanation and a citation from the historical lab notebooks alongside an answer from the artificial intelligence model, thereby ensuring transparency and allowing the user to trace a conclusion of the artificial intelligence model to underlying experimental evidence in the historical lab notebooks.

18. The method of claim 1, further comprising registering an identified chemical structure and associated identified reaction diagram into a private, queryable chemical knowledge base, wherein each structure is stored along with its assigned experimental role, predicted properties, and contextual metadata to enable future reuse in experimental design.

19. The method of claim 1, wherein the identified chemical structure and associated identified reaction diagram are directly usable within an electronic lab notebook (ELN), enabling researchers to initiate new experiments using system-registered compounds, their assigned roles, and corresponding predicted chemical and biological properties.

20. The method of claim 1, further comprising calculating at least one of a predicted property for each identified compound, the predicted property selected from the group consisting of: solubility, log P, pKa, ADMET profile, hERG inhibition, BBB permeability, and binding affinity to a specified protein target.

21. The method of claim 1, wherein the structured knowledge base supports real-time delivery of recognized compounds, reactions, and predictive insights into an ELN interface, thereby enabling a closed-loop workflow from archival extraction to experimental execution.

22. A system for transforming unstructured lab notebook data into a structured knowledge base and an interactive artificial intelligence assistant, the system comprising:
one or more processors and memory coupled thereto;
an image processing module configured to ingest and preprocess scanned images of a historical lab notebook;
an optical character recognition module configured to recognize and output text from handwritten sections of the historical lab notebook;
an optical chemical structure recognition module configured to detect graphical depictions of at least one chemical structure and reactions on the pages and convert them into machine-readable chemical representations;
a natural language processing module configured to analyze a textual content and extract entities and relationships pertinent to chemical experiments, including a chemical name, a reaction condition, and a result;
a data storage subsystem for storing the structured knowledge base that integrates a recognized chemical structure with the extracted textual metadata, forming an indexed archive of experiments; and
an AI inference engine operatively connected to the structured knowledge base and configured to at least one respond to a user query and perform analytical tasks by utilizing information in the structured knowledge base, thereby functioning as a virtual scientific assistant derived from the unstructured lab notebook data.

23. The system of claim 22, wherein the data storage subsystem is deployed within at least one of a private-cloud or on-premises network isolated by a zero-trust security perimeter, thereby preserving the confidentiality of proprietary historical lab notebook data.

24. The system of claim 22, wherein the structured knowledge base is implemented as a graph-based ontology in which nodes represent at least one of the chemical compounds, experiments, and observations, and edges represent relationships between them.

25. The system of claim 22, wherein the optical character recognition module and the optical chemical structure recognition module each comprise deep-neural-network models pre-trained and fine-tuned on handwriting samples obtained from archival scientific documents to improve recognition accuracy of low-quality pages.

26. The system of claim 22, wherein the historical lab notebook pages are periodically ingested, the resulting experimental records are incorporated into the structured knowledge base, and the AI inference engine is refreshed, thereby enabling continuous learning from ongoing research activity.

27. A non-transitory computer-readable medium storing a program instruction that, when executed by one or more processors, cause the processors to perform the computer-implemented method of:

detecting a hand-drawn depiction of at least one of a chemical structure and a reaction diagram on handwritten pages of the historical lab notebooks;

converting a handwritten depiction into a machine-readable chemical representation;

analyzing a textual content pertinent to a chemical name, a reaction condition, and a result surrounding the hand-drawn depiction;

extracting entities and relationships from a textual content and the hand-drawn depiction; and transforming an unstructured lab notebook into a structured knowledge base.

28. The method of non-transitory computer-readable medium of storing the program instructions of claim 27, wherein the program instructions further cause the processors to calculate at least one of a predicted property for each identified compound, the predicted property selected from a group consisting of solubility, log P, pKa, ADMET profile, hERG inhibition, BBB permeability, and binding affinity to a specified protein target.

29. The method of non-transitory computer-readable medium of storing the program instructions of claim 27, wherein the program instructions further comprise updating instructions that, on a scheduled basis, retrain a named-entity-recognition model and refresh a graph-based ontology when additional historical notebook data is ingested.

30. The method of non-transitory computer-readable medium of storing the program instructions of claim 27, wherein the program instructions further cause the processors to render, via an interactive user interface, both a natural-language query entry field and a structure-based query input configured to accept SMILES, InChI, and MOL file uploads, thereby allowing a user to query the structured knowledge base by semantic or chemical-structure criteria.

* * * * *